(12) United States Patent
Takeuchi et al.

(10) Patent No.: US 7,613,404 B2
(45) Date of Patent: Nov. 3, 2009

(54) IMAGE FORMING APPARATUS TRANSFERRING LOG INFORMATION

(75) Inventors: Sachiko Takeuchi, Tokyo (JP); Takashi Yoshikawa, Kanagawa (JP); Tatsuo Ito, Kanagawa (JP); Toru Matsuda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 244 days.

(21) Appl. No.: 11/239,013

(22) Filed: Sep. 30, 2005

(65) Prior Publication Data

US 2006/0085697 A1 Apr. 20, 2006

(30) Foreign Application Priority Data

Oct. 6, 2004 (JP) ............... 2004-294283

(51) Int. Cl.
G03G 15/00 (2006.01)
(52) U.S. Cl. .................. 399/8; 399/9; 399/10
(58) Field of Classification Search ............. 399/10, 399/8, 9
See application file for complete search history.

(56) References Cited

U.S. PATENT DOCUMENTS 5,872,638 A 2/1999 Haze
6,189,113 B1 2/2001 Rabb et al.
6,687,829 B1 2/2004 Miyamoto et al.
7,222,134 B1 5/2007 Maruyama et al.
2003/0014512 A1* 1/2003 Tanimoto .................. 709/223
2004/0064785 A1* 4/2004 Sasaki et al. .............. 715/500
2004/0109019 A1 6/2004 Miyamoto et al.

FOREIGN PATENT DOCUMENTS

| EP | 1 294 128 A1 | 3/2003 |
| JP | 2000339115 A * | 12/2000 |
| JP | 2002-149380 | 5/2002 |
| JP | 2002237863 A * | 8/2002 |

* cited by examiner

Primary Examiner—David M Gray
Assistant Examiner—Erika Villaluna
(74) Attorney, Agent, or Firm—Oblon, Spivak, McClelland, Maier & Neustadt, L.L.P.

(57) ABSTRACT

An image forming apparatus for performing a process relating to forming of an image includes a log management unit to manage generated log information, and a log transfer unit to transfer log information of a type specified in log transfer information among the log information managed by the log management unit to a transfer destination specified in the log transfer information.

19 Claims, 21 Drawing Sheets

FIG.16

REQUEST
```
<?xml version="1.0" encoding="UTF-8" ?>
<soapenv:Envelope xmlns:soapenv="http://schemas.xmlsoap.org/soap/envelope/"
  xmlns:xsd="http://www.w3.org/2001/XMLSchema"
  xmlns:xsi="http://www.w3.org/2001/XMLSchema-instance">
 <soapenv:Body>
   <ns1:transfer soapenv:encodingStyle="http://schemas.xmlsoap.org/soap/encoding/"
     xmlns:ns1="http://www.ricoh.co.jp/xmlns/soap/rdh/logTransfer">
     <sessionId>352759077401575</sessionId>
     <transferType>pack</transferType>
     <logInfo>
        <jobId>836120951</jobId>
        <state>completed</state>
        <entryTime>2004-08-01T13:20:30Z</entryTime>
        <finishTime>2004-08-01T13:21:45Z </finishTime>
        <type>print</type>
        <pages>5</pages>
     </logInfo>
     <logInfo>
        <jobId>836120952</jobId>
        <state>completed</state>
        <entryTime>2004-08-01T14:24:53Z </entryTime>
        <finishTime>2004-08-01T14:25:27Z </finishTime>
        <type>copy</type>
         <pages>7</pages>
     </logInfo>
      <clientName>testUser1</clientName>
   </ns1:transfer>
  </soapenv:Body>
 </soapenv:Envelope>
```

RESPONSE
```
<?xml version="1.0" encoding="UTF-8" ?>
<s:Envelope xmlns:s=http://schemas.xmlsoap.org/soap/envelope/
s:encodingStyle="http://schemas.xmlsoap.org/soap/encoding/">
 <s:Body>
   <tns:transferResponse xmlns:tns="http://www.ricoh.co.jp/xmlns/soap/rdh/logTransfer">
     <returnValue>OK</returnValue>
    </tns:transferResponse>
  </s:Body>
</s:Envelope>
```

FIG.18

DIVISION - 1/2

REQUEST
```
<?xml version="1.0" encoding="UTF-8" ?>
<soapenv:Envelope xmlns:soapenv="http://schemas.xmlsoap.org/soap/envelope/"
  xmlns:xsd="http://www.w3.org/2001/XMLSchema"
  xmlns:xsi="http://www.w3.org/2001/XMLSchema-instance">
  <soapenv:Body>
    <ns1:transfer
soapenv:encodingStyle="http://schemas.xmlsoap.org/soap/encoding/"
    xmlns:ns1="http://www.ricoh.co.jp/xmlns/soap/rdh/logTransfer">
      <sessionId>352759077401575</sessionId>
      <transferType>divide</transferType>
      <logInfo>
        <jobId>836120951</jobId>
        <part>1</part>
        <state>completed</state>
        <entryTime>yyyy-mm-ddThh:mm:ssZ</entryTime>
        <finishTime>yyyy-mm-ddThh:mm:ssZ</finishTime>
        <type>copy</type>
        <pages>7</pages>
      </logInfo>
      <clientName>testUser1</clientName>
    </ns1:transfer>
  </soapenv:Body>
</soapenv:Envelope>
```

RESPONSE
```
<?xml version="1.0" encoding="UTF-8" ?>
<s:Envelope xmlns:s=http://schemas.xmlsoap.org/soap/envelope/
s:encodingStyle="http://schemas.xmlsoap.org/soap/encoding/">
  <s:Body>
    <tns:transferResponse
xmlns:tns="http://www.ricoh.co.jp/xmlns/soap/rdh/logTransfer">
      <returnValue>OK</returnValue>
    </tns:transferResponse>
  </s:Body>
</s:Envelope>
```

FIG.19

DIVISION - 2/2

REQUEST
```
<?xml version="1.0" encoding="UTF-8" ?>
<soapenv:Envelope xmlns:soapenv="http://schemas.xmlsoap.org/soap/envelope/"
  xmlns:xsd="http://www.w3.org/2001/XMLSchema"
  xmlns:xsi="http://www.w3.org/2001/XMLSchema-instance">
 <soapenv:Body>
   <ns1:transfer
soapenv:encodingStyle="http://schemas.xmlsoap.org/soap/encoding/"
     xmlns:ns1="http://www.ricoh.co.jp/xmlns/soap/rdh/logTransfer">
     <sessionId>352759077401575</sessionId>
     <transferType>divide</transferType>
     <logInfo>
       <jobId>836120951</jobId>
       <part>2</part>
       <staple>slant</staple>
       <punch>none</punch>
       <paperSizeCount>a4:50,a3:50</paperSizeCount>
     </logInfo>
     <clientName>testUser1</clientName>
   </ns1:transfer>
 </soapenv:Body>
</soapenv:Envelope>
```

RESPONSE
```
<?xml version="1.0" encoding="UTF-8" ?>
<s:Envelope xmlns:s=http://schemas.xmlsoap.org/soap/envelope/
s:encodingStyle="http://schemas.xmlsoap.org/soap/encoding/">
 <s:Body>
   <tns:transferResponse
xmlns:tns="http://www.ricoh.co.jp/xmlns/soap/rdh/logTransfer">
     <returnValue>OK</returnValue>
   </tns:transferResponse>
 </s:Body>
</s:Envelope>
```

IMAGE FORMING APPARATUS TRANSFERRING LOG INFORMATION

BACKGROUND OF THE INVENTION

1. Field of the Invention

The present invention generally relates to image forming apparatuses, log transfer methods, and log transfer systems, and particularly relates to an image forming apparatus, a log transfer method, and a log transfer system which transfer log information to a transfer destination.

2. Description of the Related Art

In recent years, image forming apparatuses such as multifunction peripherals and laser printers have been provided with connectivity to networks such as the Internet and local area networks (LAN), thereby allowing clients on the networks to use these apparatuses. In image forming apparatuses connected to networks, log information such as a job log and an access log is kept as a record, for the purpose of monitoring the state of usage and maintaining security. Patent Document 1, for example, discloses an image forming apparatus that records log information.

[Patent Document 1] Japanese Patent Application Publication No. 2002-149380

Typical image forming apparatuses have only a limited memory capacity for use in recording log information (hereinafter referred to as log information memory capacity). If the log information memory capacity is used up, old log information needs to be erased to record new log information. Further, image forming apparatuses are not so reliable in terms of the recording of log information. In light of this, it may be conceivable to configure image forming apparatuses such as to transfer log information to a log collecting server through a network. The log collecting server may have a large log information memory capacity, and may be highly reliable in terms of the recording of log information.

Even a log collecting server having a relatively large log information memory capacity, however, ends up running out of the log information memory space in a short time if log information is transferred from a plurality of image forming apparatuses.

Further, an image forming apparatus may fail to transfer log information due to network failure or in the situation where the log collecting server is down. If the transfer of log information continues to fail, the image forming apparatus may end up running out of the memory space for recording log information before successfully transferring the log information. If the transfer of log information continues to fail, further, the log information may be lost because of the unreliable performance of the image forming apparatus.

Accordingly, there is a need for an image forming apparatus, a log transfer method, and a log transfer system which can reduce the size of log information needing to be transferred, can lower the possibility of failing to transfer log information, and can report an indication of the number of log information pieces that were lost or erased prior to transfer.

SUMMARY OF THE INVENTION

It is a general object of the present invention to provide an image forming apparatus, a log transfer method, and a log transfer system that substantially obviate one or more problems caused by the limitations and disadvantages of the related art.

Features and advantages of the present invention will be presented in the description which follows, and in part will become apparent from the description and the accompanying drawings, or may be learned by practice of the invention according to the teachings provided in the description. Objects as well as other features and advantages of the present invention will be realized and attained by an image forming apparatus, a log transfer method, and a log transfer system particularly pointed out in the specification in such full, clear, concise, and exact terms as to enable a person having ordinary skill in the art to practice the invention.

To achieve these and other advantages in accordance with the purpose of the invention, the invention provides an image forming apparatus for performing a process relating to forming of an image, which includes a log management unit to manage generated log information, and a log transfer unit to transfer log information of a type specified in log transfer information among the log information managed by the log management unit to a transfer destination specified in the log transfer information.

According to another aspect of the present invention, the log transfer unit is configured to select transfer destinations available for transfer of log information among transfer destinations having different priority as defined in the log transfer information, and to transfer the log information of the specified type to a destination having highest priority among the selected transfer destinations.

According to another aspect of the present invention, the log transfer unit is configured to count a number of log information pieces that are erased or lost without being transferred among the log information marked for transfer.

According to another aspect of the present invention, a method of transferring a log from an image forming apparatus for performing a process relating to forming of an image includes a storing step of storing generated log information in memory, and a transfer step of transferring log information of a type specified in log transfer information among the log information stored in the memory to a transfer destination specified in the log transfer information.

According to another aspect of the present invention, a log transfer system includes an image forming apparatus to perform a process relating to forming of an image, and one or more log collecting servers coupled to the image forming apparatus via a network, wherein the image forming apparatus includes a log management unit to manage generated log information, and a log transfer unit to transfer log information of a type specified in log transfer information among the log information managed by the log management unit to a transfer destination specified in the log transfer information.

According to at least one embodiment of the present invention, only the log information of the type specified in the log transfer information is transferred, thereby making it possible to reduce the size of transferred log information. Further, transfer destinations available for transfer of log information are selected among transfer destinations having different priority as defined in the log transfer information, which makes it possible to lower the possibility of failing to transfer log information. Moreover, the number of log information pieces that are erased or lost without being transferred among the log information marked for transfer is counted, which makes it possible to report the number of log information pieces that were lost or erased prior to transfer.

According to at least one embodiment of the present invention, it is possible to provide an image forming apparatus, a log transfer method, and a log transfer system which can reduce the size of log information needing to be transferred, can lower the possibility of failing to transfer log information, and can report an indication of the number of log information pieces that were lost or erased prior to transfer.

BRIEF DESCRIPTION OF THE DRAWINGS

Other objects and further features of the present invention will be apparent from the following detailed description when read in conjunction with the accompanying drawings, in which:

FIG. 16 is an illustrative drawing showing an example of a SOAP message for transferring merged log information;

FIG. 18 is an illustrative drawing showing an example of a SOAP message for transferring divided log information FIG. 19 is an illustrative drawing showing an example of a SOAP message for transferring divided log information;

DESCRIPTION OF THE PREFERRED EMBODIMENTS

In the following, embodiments of the present invention will be described with reference to the accompanying drawings. These embodiments will be described by taking a multifunction peripheral as an example of an image forming apparatus where the multifunction peripheral includes the function of a printer, a copier, a facsimile device, a scanner, etc., in a single housing. This is not a limiting example, and any image forming apparatus that records log information may be used.

In the present invention, log information is defined as the history of operations performed with respect to the image forming apparatus for the purpose of using or enabling the functions or settings provided in the image forming apparatus. The log information may also include the responses of applications provided in the image forming apparatus responding to such operations, and may further include the results of processes performed by the applications.

Figure 1:
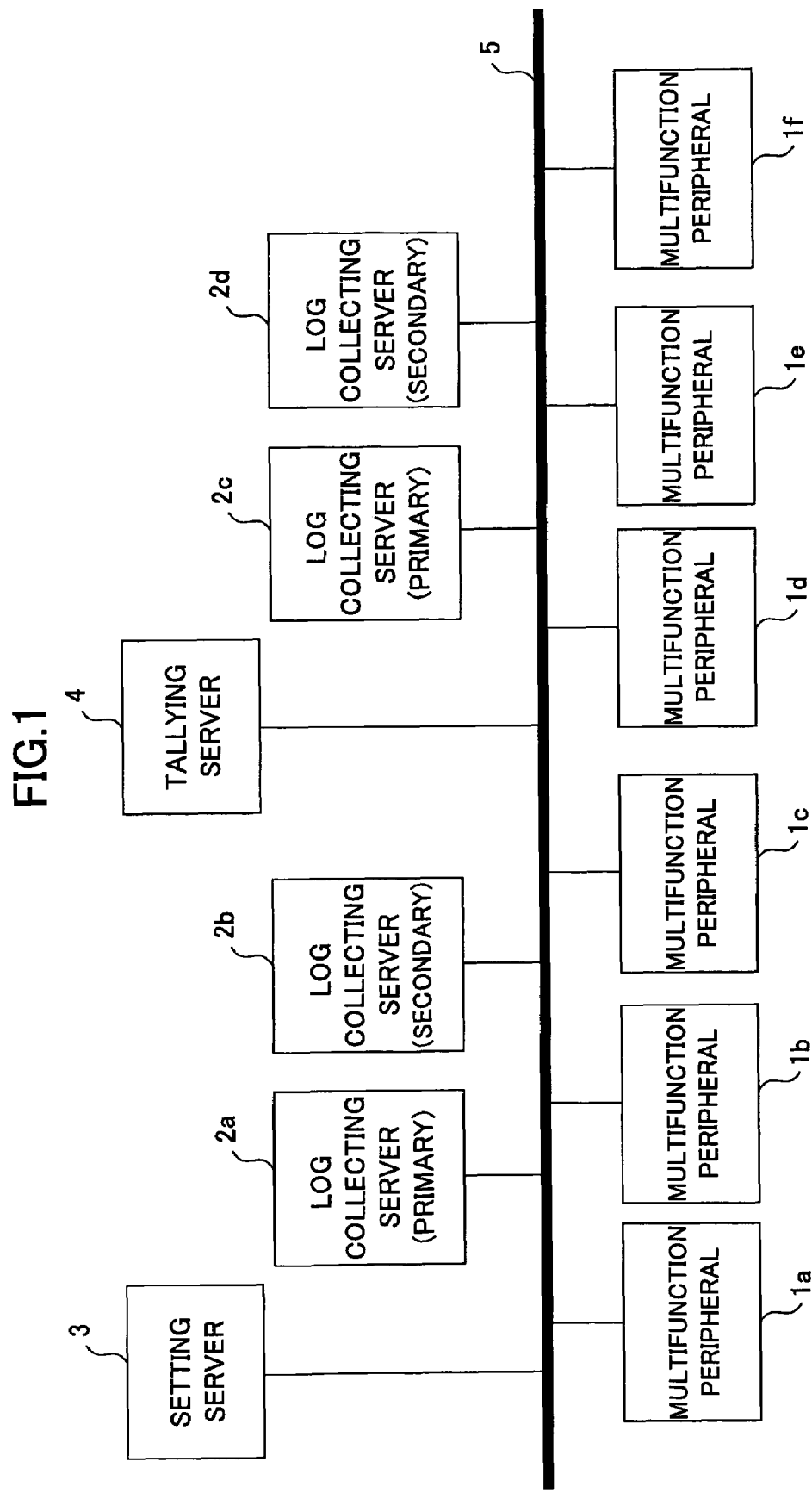
FIG. 1 is a block diagram showing an example of an embodiment of a log transfer system according to the present invention.

FIG. 1 is a block diagram showing an example of an embodiment of a log transfer system according to the present invention. The log transfer system shown in FIG. 1 includes one ore more multifunction peripherals 1a through 1f, primary or secondary log collecting servers 2a through 2d, a setting server 3, and a tallying server 4, which are coupled together via a network 5 such as the Internet or a LAN. When referring to any single one of the multifunction peripherals 1a through 1f, a reference number "1" will be used. When referring to any one of the log collecting servers 2a through 2d, a reference number "2" will be used.

The multifunction peripheral 1 accumulates long information such as a job log and an access log as it is generated. Further, the multifunction peripheral 1 transfers log information as specified in log transfer information among the accumulated log information to the log collecting server 2 (URL) specified in the log transfer information at the transfer timing as specified in the log transfer information. Further, the multifunction peripheral 1 counts a log lost count indicative of the number of log information pieces that were erased or lost prior to the transfer to the log collecting server 2, and transmits the log lost count to the log collecting server 2 specified in the log transfer information.

The multifunction peripheral 1 operates as a client. The multifunction peripheral 1 access a Web service provided by the log collecting server 2, and transfers log information by use of the SOAP (simple object access protocol), for example. The multifunction peripheral 1 can transfer to the primary log collecting server 2 or to the secondary log collecting server 2. The multifunction peripheral 1 transfers log information to the secondary log collecting server 2 when it cannot transfer the log information to the primary log collecting server 2.

The log collecting server 2 collects log information from one or more multifunction peripherals 1. The primary log collecting server 2 and secondary log collecting server 2 together form a single group. In an example shown in FIG. 1, the primary log collecting server 2a and the secondary log collecting server 2b together form one group, and the primary log collecting server 2c and the secondary log collecting server 2d together form another group.

The setting server 3 can set log transfer information with respect to one or more multifunction peripherals 1. The setting of log transfer information for the multifunction peripheral 1 may be performed through an operation panel of the log collecting server 2 or multifunction peripheral 1. The tallying server 4 tallies log information collected by one or more log collecting servers 2.

Processed performed by the log transfer system described above includes a log transfer information setting process, a log transfer process, and a log lost count transfer process. The log transfer information setting process will be described first. In the log transfer information setting process, log transfer information is set with respect to the multifunction peripheral 1. The setting of the log transfer information for the multifunction peripheral 1 may be performed prior to the commencement of transfer of log information through the operation panel of the multifunction peripheral 1, through the log collecting server 2, or through the setting server 3.

The log transfer information includes, as items to be set, the presence/absence of transfer, a primary log collecting server, a secondary log collecting server, a transfer start method, a transfer start time, a transfer time interval, an authentication ticket, and a transfer job type.

The item "presence/absence of transfer" serves to specify whether to perform a log transfer. The item "primary log collecting server" serves to specify the URL of the Web service of the primary log collecting server 2. The item "secondary log collecting server" serves to specify the URL of the Web service of the secondary log collecting server 2. The item "transfer start method" serves to specify either a consecutive transfer or a constant-time-interval transfer. When the multifunction peripheral 1 is not provided with a storage device such as a hard disc drive (HDD), the consecutive transfer may preferably be an only selectable option.

The item "transfer start time" serves to specify the time at which transfer starts. Provision may be made such that the time can be specified as being immediately after the startup of the multifunction peripheral 1. The item "transfer time interval" serves to specify a time interval in the case of the constant-time-interval transfer. The item "authentication ticket" serves to specify an authentication ticket that is to be authenticated for the log transfer process. The item "transfer job type" serves to specify the type of log information that is to be transferred.

Setting of log transfer information may be performed separately for each multifunction peripheral 1. For example, the multifunction peripheral 1 may transfer log information to a log collecting server 2 of a different group for each different type of log information according to the contents of the log transfer information. Alternatively, the multifunction peripheral 1 may transfer the same log information to a log collecting server 2 of a different group according to the contents of the log transfer information.

The log transfer process will be described next. Log information accumulated in the multifunction peripheral 1 is transferred to the log collecting server 2 according to the contents of the log transfer information. The log transfer process may be initiated by the multifunction peripheral 1, for example. The log information transferred from the multifunction peripheral 1 includes a job log that is created in response to the normal completion or abnormal completion of a job action, an access log that is created in response to an access, etc.

If the item "transfer start method" specified in the log transfer information indicates a consecutive transfer, the multifunction peripheral 1 starts transferring log information to the log collecting server 2 immediately after the log information is generated. If the item "transfer start method" specified in the log transfer information indicates a constant-time-interval transfer, the multifunction peripheral 1 starts the transfer of log information to the log collecting server 2 at transfer time intervals specified in the item "transfer time interval" after the transfer start time specified in the item "transfer start time".

No matter whether the item "transfer start method" in the log transfer information specifies a consecutive transfer or a constant-time-interval transfer, the log information that has been accumulated by the first log transfer time following the transfer start time is transferred if the setting in the log transfer information is changed. The log transfer system may divide or merge the log information according to the data size of the log information for transfer from the multifunction peripheral 1 to the log collecting server 2.

If the transfer of log information fails, the multifunction peripheral 1 does not attempt an immediate retransfer, and transfers the log information at the next transfer timing. When failing to transfer log information, the multifunction peripheral 1 may record an error message. When transferring log information to the log collecting server 2, the multifunction peripheral 1 also transmits the authentication ticket specified in the item "authentication ticket".

In the following, a description will be given of the log lost count transfer process. When the log information memory capacity is used up, the multifunction peripheral 1 erases old log information. It might also be possible that the multifunction peripheral 1 loses log information upon power off. When the log information that was going to be transferred is erased or lost due to the reasons such as those described above, the multifunction peripheral 1 keeps a count indicative of the number of log information items that are erased or lost, followed by transferring this count as a log lost count to the log collecting server 2. For example, the multifunction peripheral 1 may transfer the log lost count together with log information at the next transfer timing.

Figure 2:
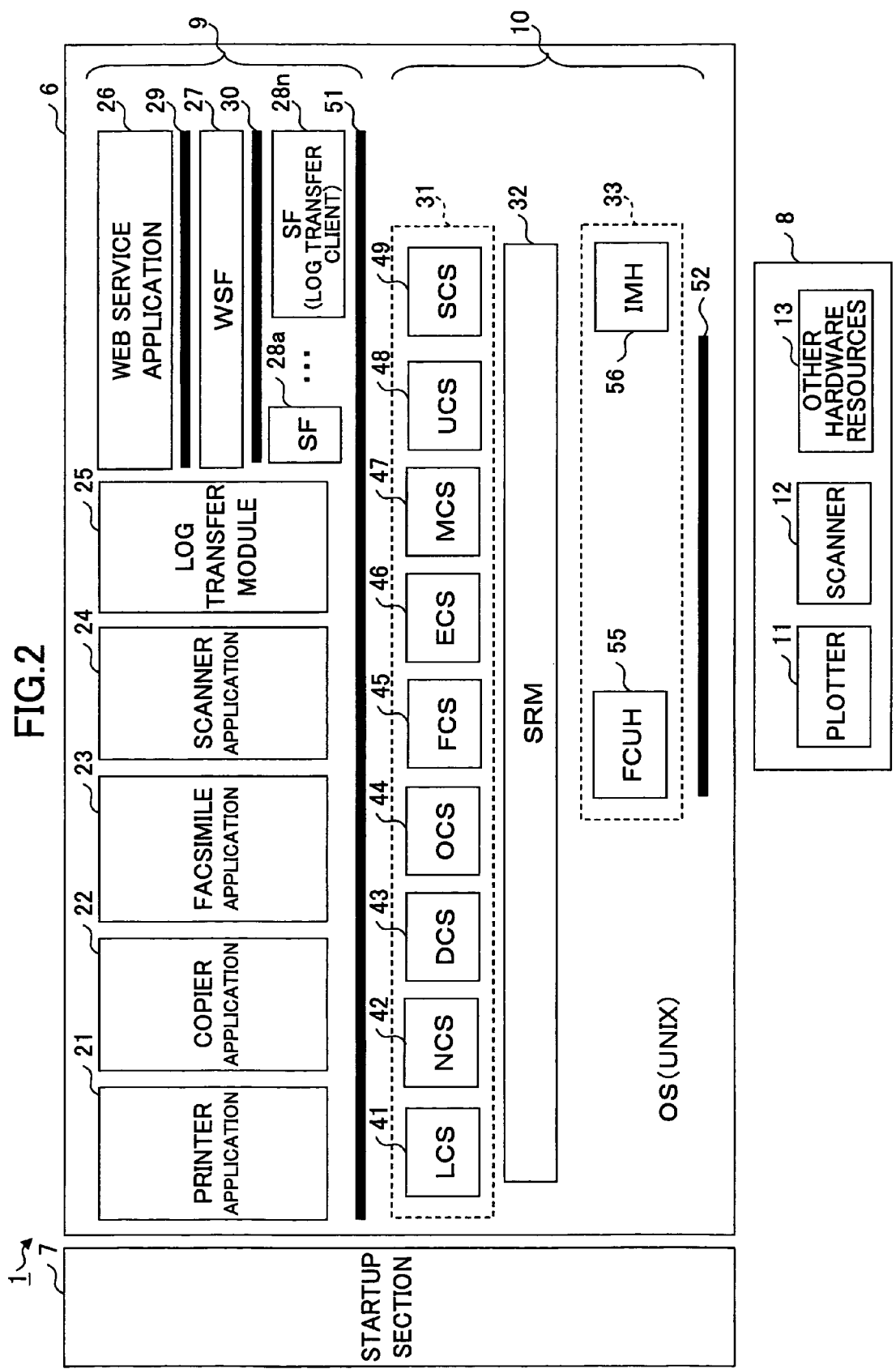
FIG. 2 is a block diagram showing an embodiment of the software configuration of a multifunction peripheral according to the present invention.

In the following, the detail of the log transfer system according to the present invention will be described with the focus being on the processes performed by the multifunction peripheral 1. FIG. 2 is a block diagram showing an embodiment of the software configuration of the multifunction peripheral according to the present invention. The multifunction peripheral 1 includes a software set 6, a startup section 7, and hardware resources 8.

The hardware resources 8 include a plotter 11, a scanner 12, and other hardware resources 13 such as a facsimile device. The software set 6 includes an application layer 9 and a platform 10 running on an operating system (hereinafter referred to as OS) such as the UNIX (registered trademark). The application layer 9 includes programs for processes relating to image formation such as a printer, a copier, a facsimile, a scanner, etc., and also includes programs for processes relating to Web services.

The application layer 9 shown in FIG. 2 includes a printer application 21, a copier application 22, a facsimile application 23, a scanner application 24, a log transfer module 25, a Web service application 26, a Web service function 27 (hereinafter referred to as WSF), and service functions 28*a* through 28*n* (hereinafter referred to as SF). When referring to any one of the SFs 28*a* through 28*n*, a reference number 28 will be used.

The WSF 27 is provided with an application program interface 29 (hereinafter referred to as API), which makes it possible to receive a request from the Web service application 26 through a predefined function. The SF 28 is provided with an API 30, which makes it possible to receive a request from the WSF 27 through a predefined function.

Upon receiving a request from the Web service application 26, the WSF 27 converts the received request into a request for the SF 28. The WSF 27 selects a single SF 28 according to the request, and transmits the request to the selected SF 28 via the API 30. Upon receiving the request, the SF 28 performs a process responsive to the request. In the configuration of the multifunction peripheral 1 shown in FIG. 2, the SF 28*n* serves as a log transfer client, for example, as will later be described.

The platform 10 includes a control service layer 31 which interprets a request from the application layer 9 to generate a request for acquiring the hardware resources 8, a system resource manager (SRM) 32 which manages one or more hardware resources 8 to arbitrate acquisition requests from the control service layer 31, and a handler layer 33 which manages the hardware resources 8 in response to the acquisition request from the SRM 32. The control service layer 31 is configured to include one or more service modules such as an LCS 41, an NCS 42, a DCS 43, an OCS 44, an FCS 45, an ECS 46, an MCS 47, a UCS 48, and an SCS 49.

The platform 10 is configured to include API 51, which makes it possible to receive a request from the application layer 9 through a predefined function. The OS executes processes in parallel with respect to the software of the application layer 9 and the software of the platform 10.

The process of the LCS (log control service) 41 generates long information in response to an event that is received from another control service or another event generating module such as an application. The process of the LCS 41 also manages the log information.

The process of the NCS (network control service) 42 serves as an intermediary to distribute data to each application as the data is received through respective protocols from the network, and also serves as an intermediary to transmit data to the network as the data is received from each application.

The process of the DCS (delivery control service) 43 controls the delivery of document data accumulated in the multifunction peripheral 1. The process of the OCS (operation panel control service) 44 controls an operation unit, which will later be described.

The process of the FCS (fax control service) 45 provides API for performing fax transmission and reception through the PSTN or ISDN network for the application layer 9, the registration/referencing of various fax data stored in backup memory, fax scanning, received fax printing, etc.

The process of the ECS (engine control service) 46 controls engine units such as the plotter 11, the scanner 12, and the hardware resources 13. The process of the MCS (memory control service) 47 performs control such as the acquisition and release of memory, the use of HDD, the compression and decompression of image data, etc. The process of the UCS (user information control service) 48 manages user information.

The process of the SCS (system control service) 49 attends to processes such as operation-panel control, system screen display, LED display, hardware resource management, application management, interrupting application control, etc.

The process of the SRM 32, together with the SCS 49, performs system control and the management of the hardware resources 8. For example, the process of the SRM 32 arbitrates in response to acquisition requests from the higher-order layers that are in need of using the hardware resources 8 such as the plotter 11 and the scanner 12, thereby controlling the execution of the hardware resources 8.

Specifically, the process of the SRM 32 checks whether the hardware resources 8 requested for acquisition are available (i.e., whether they are not in use by other acquisition requests). If they are available, the process of the SRM 32 notifies the higher-order layer that the hardware resources 8 requested for acquisition are available. Moreover, the process of the SRM 32 attends to scheduling for use of the hardware resources 8 in response to the acquisition requests from the higher-order layers, and carries out what is requested, e.g., paper feeding and imaging by the printer engine, memory allocation, file creation, etc.

Moreover, the handler layer 33 includes an FCUH (fax control unit handler) 55 that controls and manages an FCU (fax control unit), which will later be described. The handler layer 33 further includes an IMH (image memory handler) 56, which manages the allocation of memory areas to processes and manages the memory areas assigned to the processes.

The SRM 32 and the FCUH 55 issue a request to the hardware resources 8 by use of an engine I/F 52, which enables transmission of the request to the hardware resources 8 by use of a predefined function. With the configuration shown in FIG. 2, the multifunction peripheral 1 uses the platform 10 to achieve central processing of various processes required in common by each application.

Figure 3:
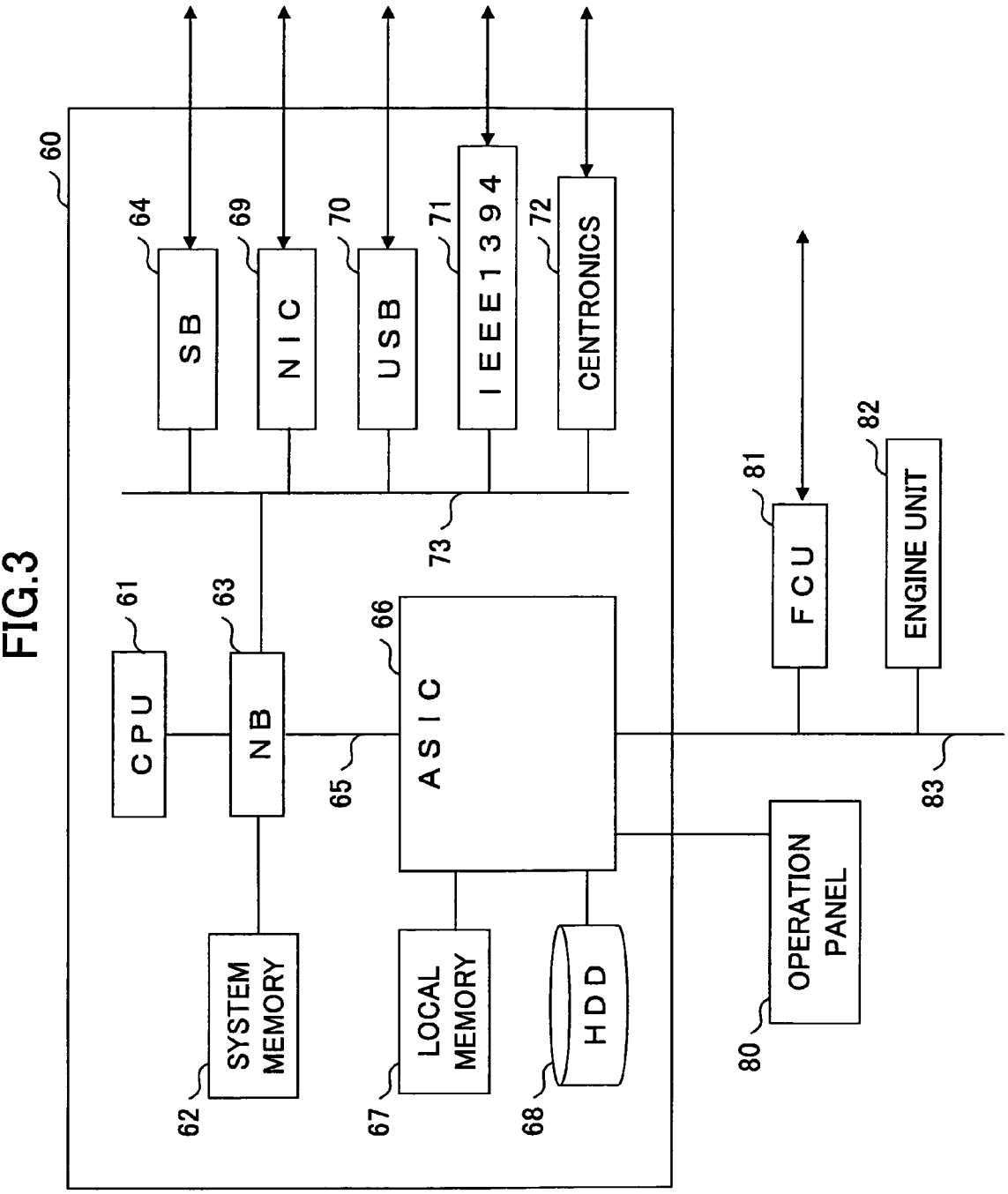
FIG. 3 is a block diagram showing an embodiment of the hardware construction of the multifunction peripheral according to the present invention.

FIG. 3 is a block diagram showing an embodiment of the hardware construction of the multifunction peripheral according to the present invention. The multifunction peripheral 1 shown in FIG. 3 includes a controller 60, an operation panel 80, a FCU 81, and an engine unit 82.

The controller 60 includes a CPU 61, a system memory 62, an NB 63, an SB 64, an ASIC 66, a local memory 67, an HDD 68, a NIC 69, a USB I/F 70, an IEEE1394 I/F 71, and a Centronics I/F 72. The operation panel 80 is connected to the ASIC 66 of the controller 60. The FCU 81 and the engine unit 82 are connected to the ASIC 66 of the controller 60 through a PCI bus 83.

The controller 60 has the local memory 67 and the HDD 68 connected to the ASIC 66, and the CPU 61 and the ASIC 66 are connected through the NB 63 of a CPU chip set. The ASIC 66 and the NB 63 are connected through an AGP (accelerated graphics port) 65.

The CPU 61 is responsible for overall control of the multifunction peripheral 1. In the multifunction peripheral 1 shown in FIG. 2, the CPU 61 starts and executes, on the OS, the service modules constituting the control service layer 31, the SRM 32, and the FCUH 55 and the IMH 56 constituting the handler layer 33.

The CPU 61 also starts and executes the printer application 21, the copy application 22, the fax application 23, the scanner application 24, the log transfer module 25, the Web service application 26, the WSF 27, and the SFs 28a through 28n, which constitute the application layer 9.

The NB (north bridge) 63 is a bridge for connecting the CPU 61, the system memory 62, the SB 64, the ASIC 66, the NIC 69, the USB I/F 70, the IEEE1394 I/F 71, and the Centronics I/F 72. The NB 63 is coupled to the SB 64, the NIC 69, the USB I/F 70, the IEEE1394 I/F 71, and the Centronics I/F 72 via a PCI bus 73. The SB (south bridge) 64 is a bridge for coupling the PCI bus 73 to a ROM, peripheral devices, and so on.

The system memory 62 is used as a picture-rendering memory and the like. The local memory 67 is used as a copy-purpose image buffer and also as a code buffer. The ASIC 66 is an image-processing-purpose IC that includes hardware elements for image processing. The HDD 68 is an example of the storage (auxiliary memory device) for storing image data, document data, programs, font data, forms, etc.

The NIC (network interface card) 69 is an interface device for connecting the multifunction peripheral 1 to a network such as the Internet or a LAN. The USB I/F 70, the IEEE1394 I/F 71, and the Centronics I/F 72 are interfaces complying to the respective standards. The operation panel 80 serves as an operating unit to receive inputs through user operations and to provide a display presentation to the user. The FCU 81 includes a backup memory. The memory of the FCU 81 is used as a temporal storage for storing facsimile data that is received while the power of the multifunction peripheral 1 is off, for example.

Figure 21:
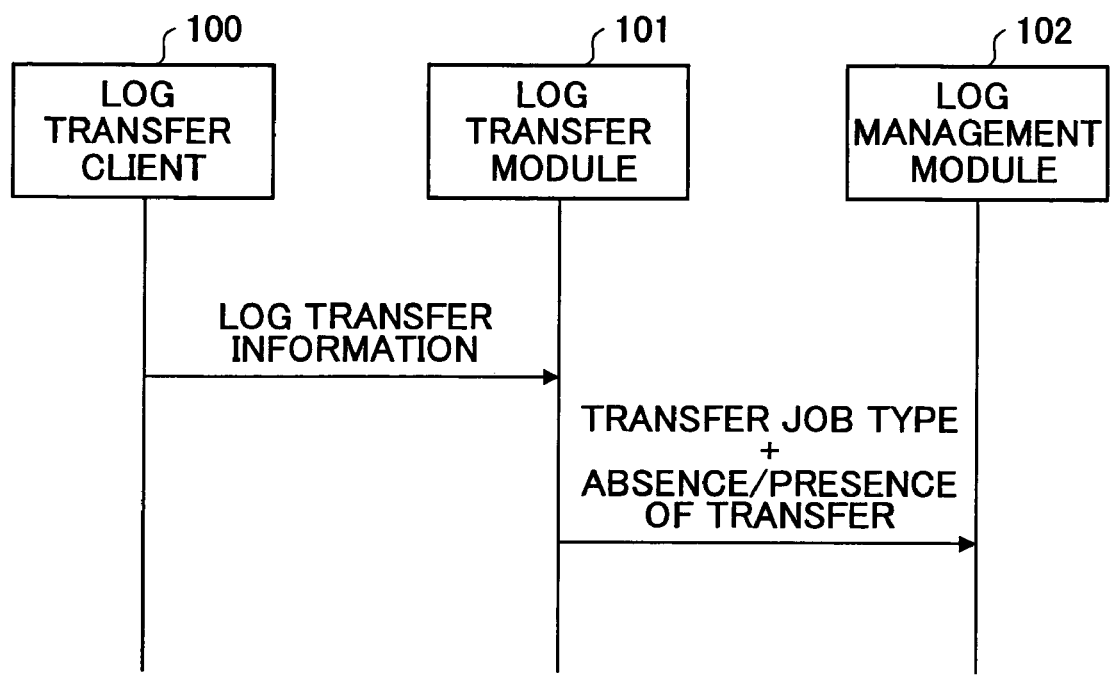
FIG. 21 is a sequence chart showing a process of performing a log transfer initial setting.

FIG. 21 is a sequence chart showing a process of performing a log transfer initial setting. A log transfer client 100 corresponds to the SF 28n shown in FIG. 2. A log transfer module 101 corresponds to the log transfer module 25 shown in FIG. 2. A log management module 102 corresponds to the LCS 41 shown in FIG. 2.

As shown in FIG. 21, the log transfer client 100 transmits the log transfer information as previously described to the log transfer module 101. The log transfer module 101 then transmits the items "presence/absence of transfer" and "transfer job type" of the log transfer information to the log management module 102. The item "transfer job type" may indicate a printer job, a scanner job, a copier job, a FAX job, etc. For each transfer jog type, the item "presence/absence of transfer" specifies whether corresponding log information needs to be transferred. Namely, when log information is generated for a certain job, the "transfer job type" corresponding to this job is identified, and "presence/absence of transfer" associated with the identified "transfer job type" is referred to so as to determine whether the generated log information needs to be transferred.

Figure 4:
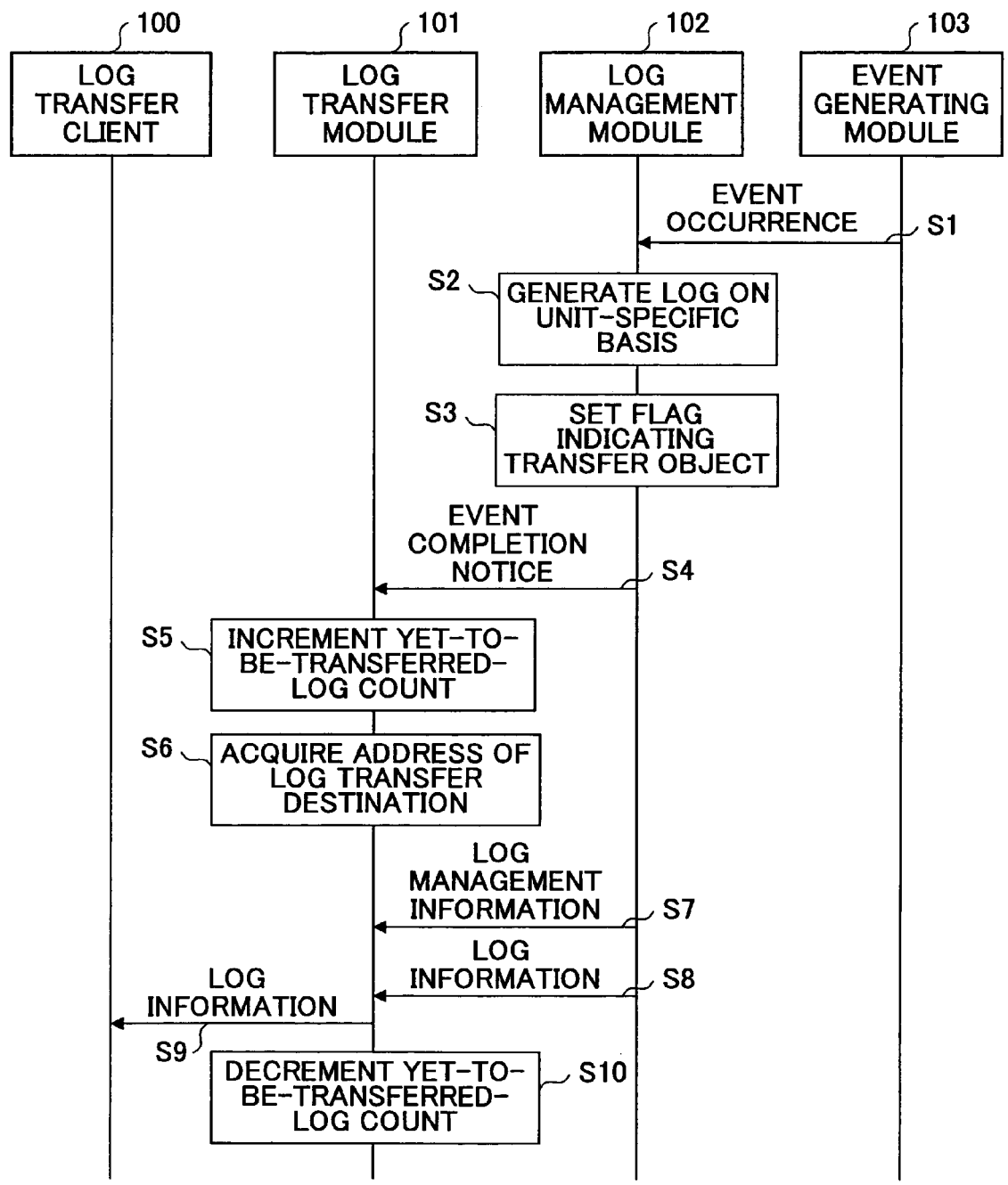
FIG. 4 is a sequence chart showing an example of processes from the occurrence of an event to the transfer of a log.

The multifunction peripheral 1 performs processes relating to the transfer of log information and a log lost count as shown in the following sequence chart. FIG. 4 is a sequence chart showing an example of processes from the occurrence of an event to the transfer of a log. The log transfer client 100 corresponds to the SF 28*n* shown in FIG. 2. The log transfer module 101 corresponds to the log transfer module 25 shown in FIG. 2. The log management module 102 corresponds to the LCS 41 shown in FIG. 2.

An event generating module 103 generates an event that causes log information to be generated and modified for management by the log management module 102, such event being generated separately for each of the start of printing and the end of printing in the case of a print operation, for example. The event generating module 103 corresponds to the concurrently executed processes of the various software units which constitute the application layer 9 and the platform 10 shown in FIG. 2.

At step S1, the event generating module 103 generates an event that causes log information to be generated and modified under the control of the log management module 102. Upon the generation of an event, the log management module 102 generates log information separately for each predetermined unit at step S2. Here, a predetermined unit may be defined as one job operation, or may be defined as a series of job operations such as a scan operation and a FAX operation associated therewith. A predetermined unit may be defined according to user need.

At step S3, the log management module 102 checks whether or not the generated log information is subjected to transfer based on the item "presence/absence of transfer" contained in the log transfer information. If the log information is subjected to transfer, the log management module 102 sets a flag indicating a transfer object.

At step S4, the log management module 102 transmits an event completion notice to the log transfer module 101. At step S5, the log transfer module 101 increments a yet-to-be-transferred-log count. The yet-to-be-transferred-log count indicates the number of log information pieces that have not yet been transferred among the log information marked for transfer.

At step S6, the log transfer module 101 acquires addresses (e.g., URLs) of destinations of the log information based on the items "primary log collecting server" and "secondary log collecting server" specified in the log transfer information.

At step S7, the log management module 102 transmits log management information to the log transfer module 101. At step S8, the log management module 102 transmits the log information to the log transfer module 101. Here, the log management information is about events generated in connection with log management such as the number of logs that are lost without being transferred (usually such number is zero).

At step S9, the log transfer module 101 transmits the log information to the log transfer client 100 to request the transfer of the log information. The log transfer client 100 transfers the log information to the address having higher priority (e.g., the primary log collecting server 2*a* shown in FIG. 1) among the addresses acquired at step S6. If it is not possible to transfer the log information to the address having higher priority, the log transfer client 100 transfers the log information to the address having lower priority (e.g., the secondary log collecting server 2*b* shown in FIG. 1) among the acquired addresses.

At step S10, the log transfer module 101 decrements the yet-to-be-transferred-log count in response to a success in the transfer of the log information. The sequence chart of FIG. 4 illustrates a case in which a single event is transmitted from the event generating module 103 without any subsequent anomaly.

According to the sequence chart shown in FIG. 4, the log information marked for transfer in the log transfer information, among all the generated log information, is transferred to a transfer destination specified in the log transfer information. Further, according to the sequence chart shown in FIG. 4, the number of log information pieces that have not yet been transferred, among the log information marked for transfer, is counted as a yet-to-be-transferred-log count.

Figure 5:
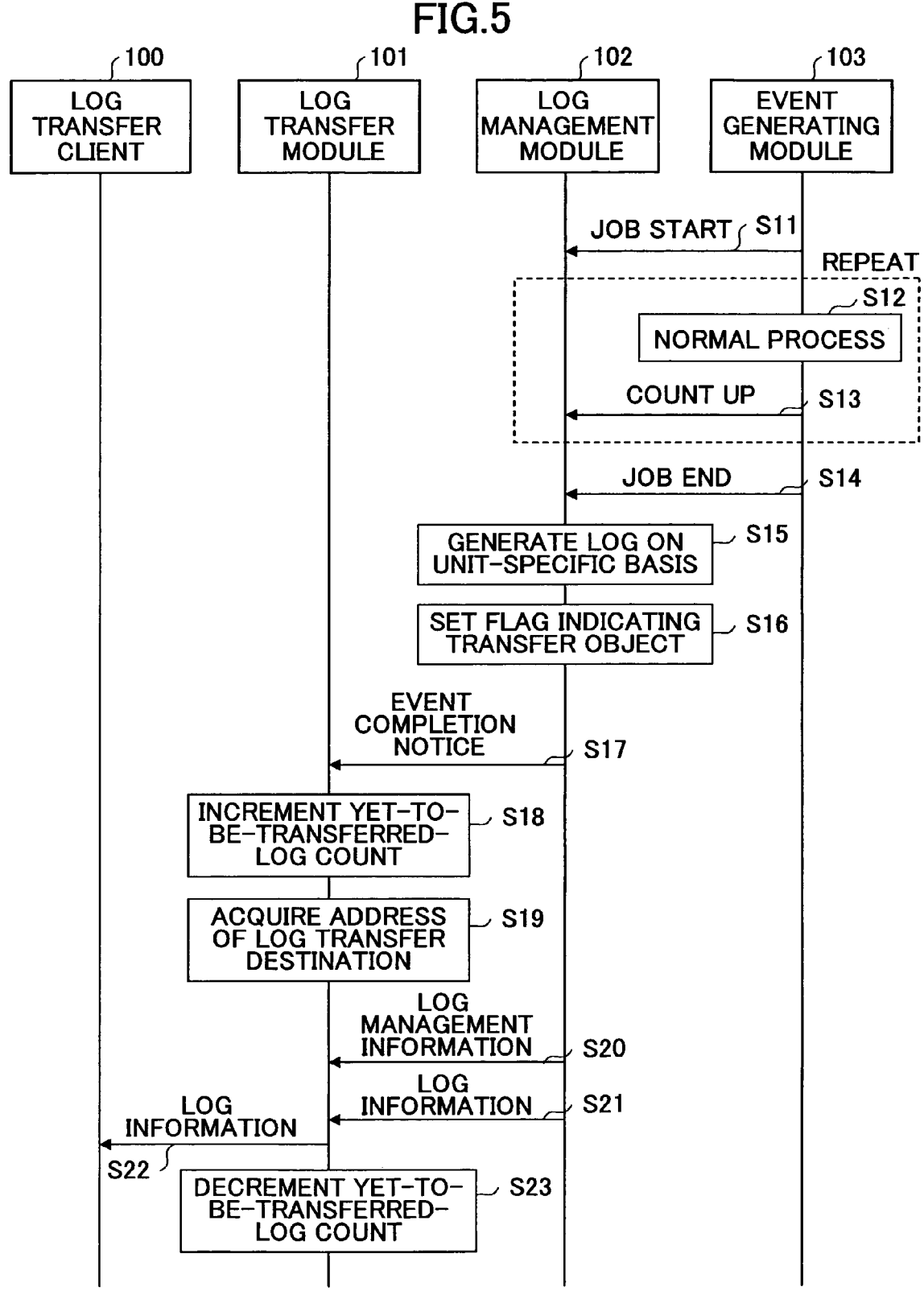
FIG. 5 is a sequence chart showing an example of processes from the occurrence of an event to the transfer of a log.

FIG. 5 is a sequence chart showing an example of processes from the occurrence of an event to the transfer of a log. The sequence chart of FIG. 5 is the same as the sequence chart of FIG. 4, except for a portion thereof, and a description thereof will be omitted as appropriate.

At step S11, the event generating module 103 generates a start event of a job operation, and notifies the log management module 102. At step S12, the event generating module 103 performs a normal process. At step S13, the event generating module 103 notifies the log management module 102 of a count-up. The processes of steps S12 and S13 will be repeatedly performed until the job operation comes to an end.

When the job operation is completed, the event generating module 103 generates an end event of the job operation at step S14, and notifies the log management module 102. In response to the generation of the end event of the job operation, the log management module 102 moves on to step S15. The processes of steps S15 through S23 are the same as those of steps S2 through S10 shown in FIG. 4, and a description thereof will be omitted. The sequence chart of FIG. 5 illustrates a case in which the start end event is a normal completion.

Figure 6:
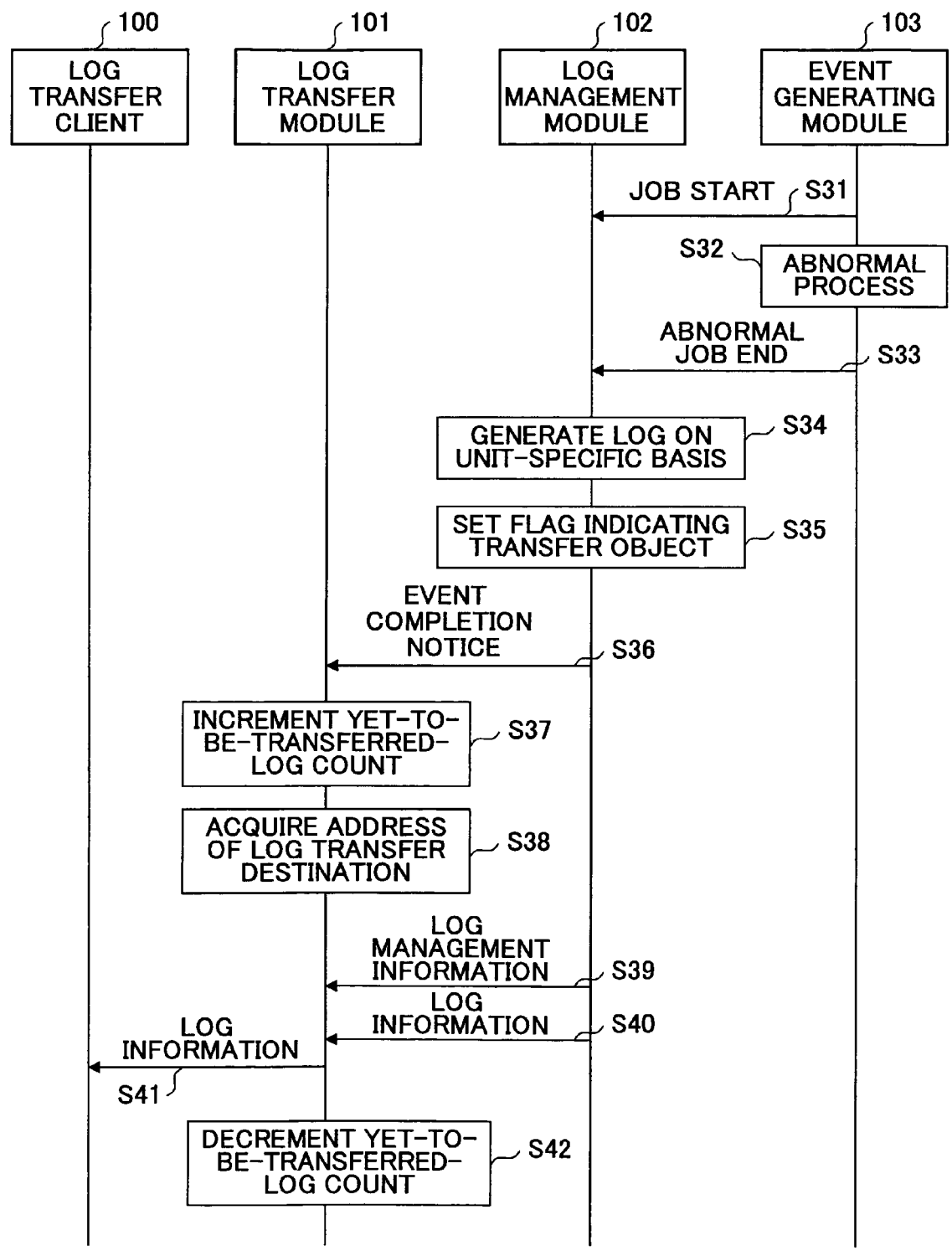
FIG. 6 is a sequence chart showing another example of processes from the occurrence of an event to the transfer of a log.

FIG. 6 is a sequence chart showing another example of processes from the occurrence of an event to the transfer of a log. The sequence chart of FIG. 6 is the same as the sequence chart of FIG. 4, except for a portion thereof, and a description thereof will be omitted as appropriate.

At step S31, the event generating module 103 generates a start event of a job operation, and notifies the log management module 102. At step S32, the event generating module 103 performs an abnormal process. When the job operation is completed abnormally, at step S33, the event generating module 103 generates an abnormal completion event of the job operation, which is reported to the log management module 102. In response to the occurrence of the abnormal completion event of the jog operation, the log management module 102 moves on to step S34. The processes of steps S34 through S42 are the same as those of steps S2 through S10 shown in FIG. 4, and a description thereof will be omitted. The sequence chart of FIG. 6 illustrates a case in which the start end event is an abnormal completion.

Figure 7:
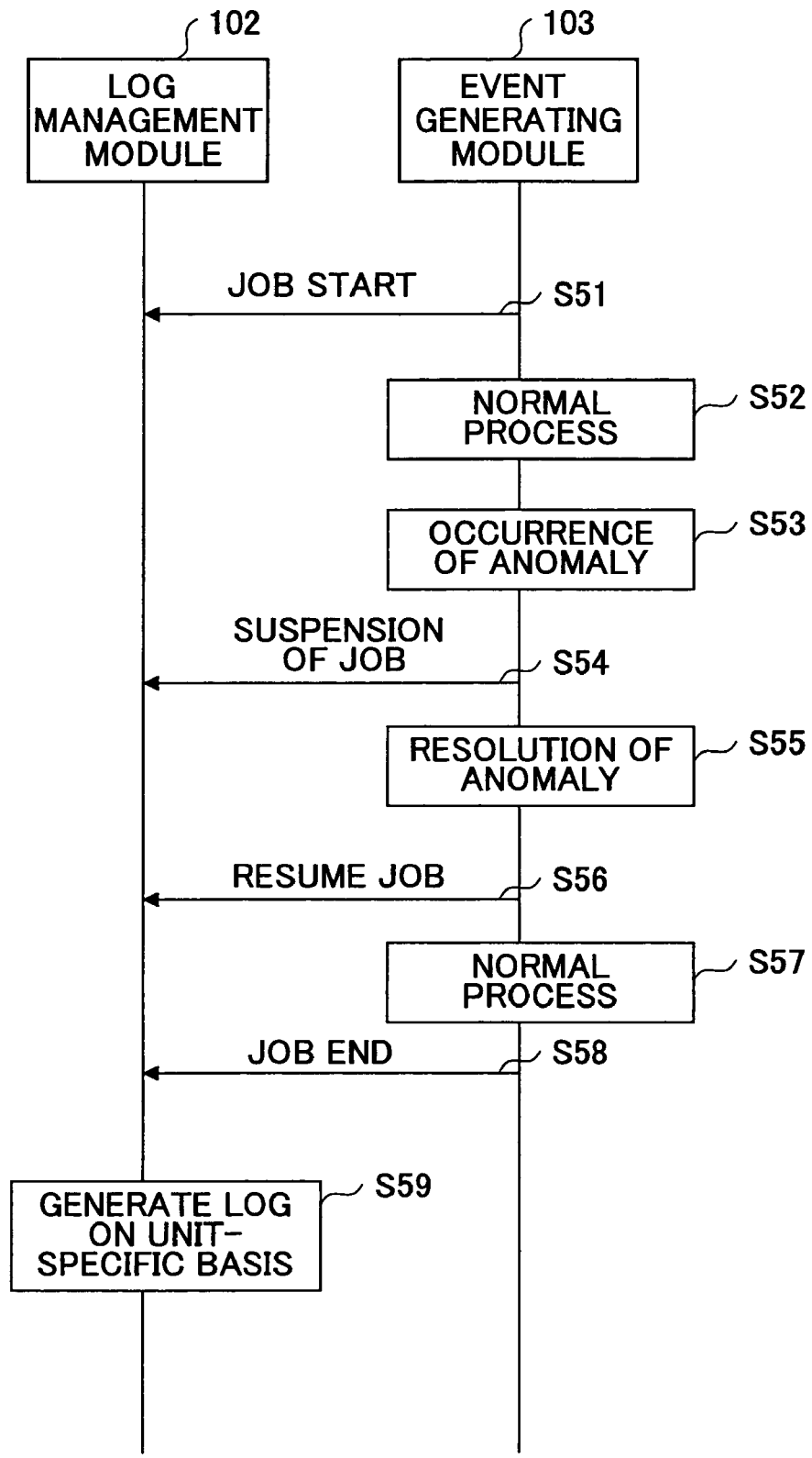
FIG. 7 is a sequence chart showing an example of processes from the occurrence of an event to the generation of a log.

FIG. 7 is a sequence chart showing an example of processes from the occurrence of an event to the generation of a log. At step S51, the event generating module 103 generates a start event of a job operation, which is reported to the log management module 102. At step S52, the event generating module 103 performs a normal process.

At step S53, anomaly occurs in the event generating module 103. In response to the occurrence of the anomaly, the event generating module 103 notifies the log management module 102 of a suspension of the job operation at step S54. At step S55, the anomaly that occurred in the event generating module 103 is resolved.

In response to the resolution of the anomaly, the event generating module 103 notifies the log management module 102 of a resumption of the job operation at step S56. At step S57, the event generating module 103 performs a normal process. When the job operation comes to an end, the event generating module 103 generates an end event of the job operation to notify the log management module 102 of the end event at step S58. In response to the occurrence of the end event of the job operation, the log management module 102 generates log information separately for each predetermined unit at step S59. The sequence chart of FIG. 7 illustrates a case in which the job operation starts, and is then suspended, followed by being resumed, and then coming to an end without any trouble.

Figure 8:
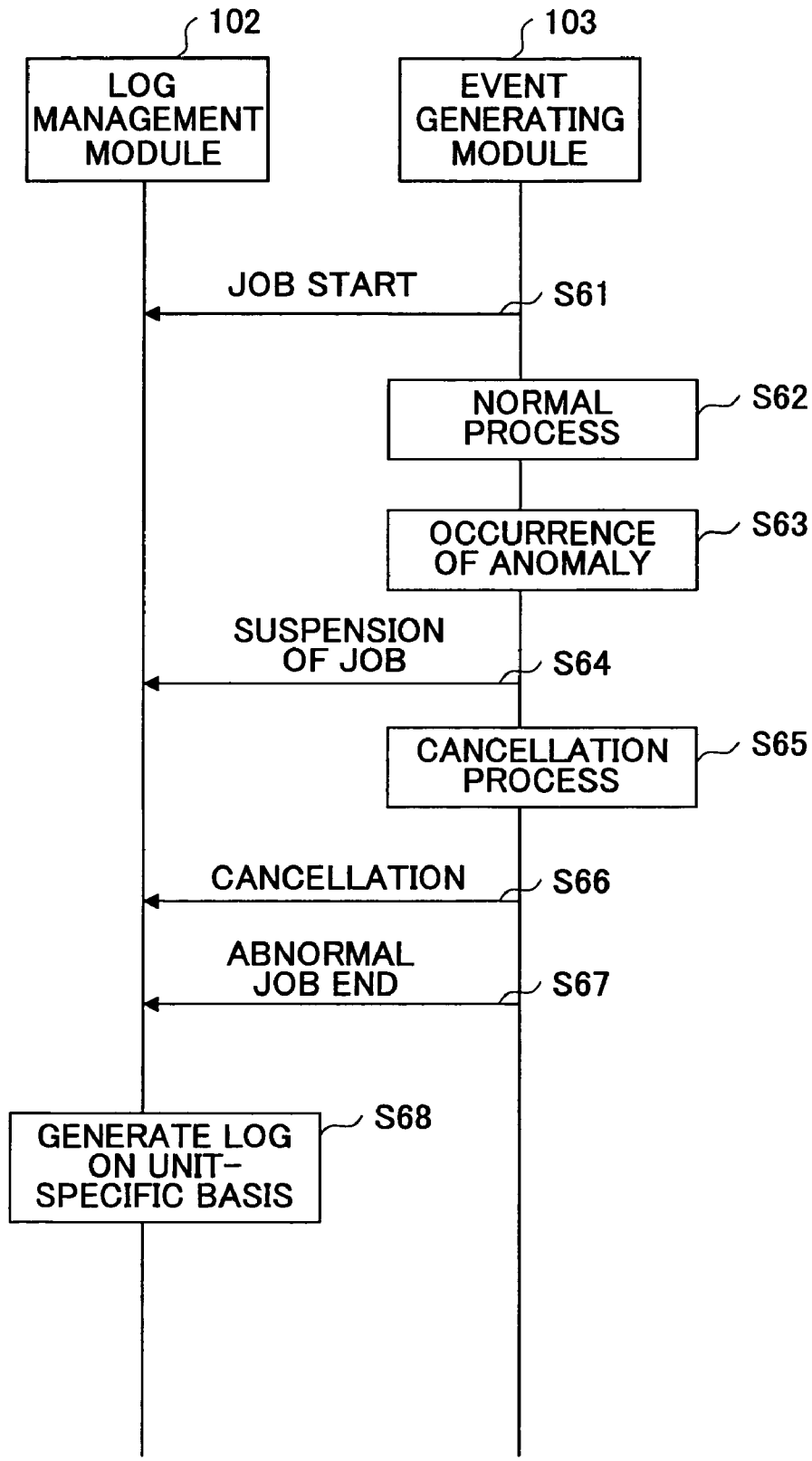
FIG. 8 is a sequence chart showing another example of processes from the occurrence of an event to the generation of a log.

FIG. 8 is a sequence chart showing another example of processes from the occurrence of an event to the generation of a log. At step S61, the event generating module 103 generates a start event of a job operation, which is reported to the log management module 102. At step S62, the event generating module 103 performs a normal process.

At step S63, anomaly occurs in the event generating module 103. In response to the occurrence of the anomaly, the event generating module 103 notifies the log management module 102 of a suspension of the job operation at step S64. At step S65, the event generating module 103 cancels the job operation.

At step S66, the event generating module 103 notifies the log management module 102 of the cancellation of the job operation. At step S67, the event generating module 103 generates an abnormal completion event of the job operation to notify the log management module 102 of the abnormal completion event. In response to the occurrence of the abnormal completion event of the job operation, the log management module 102 generates log information separately for each predetermined unit at step S68. The sequence chart of FIG. 8 illustrates a case in which the job operation starts, and is then suspended, followed by being canceled, resulting in an abnormal completion.

Figure 9:
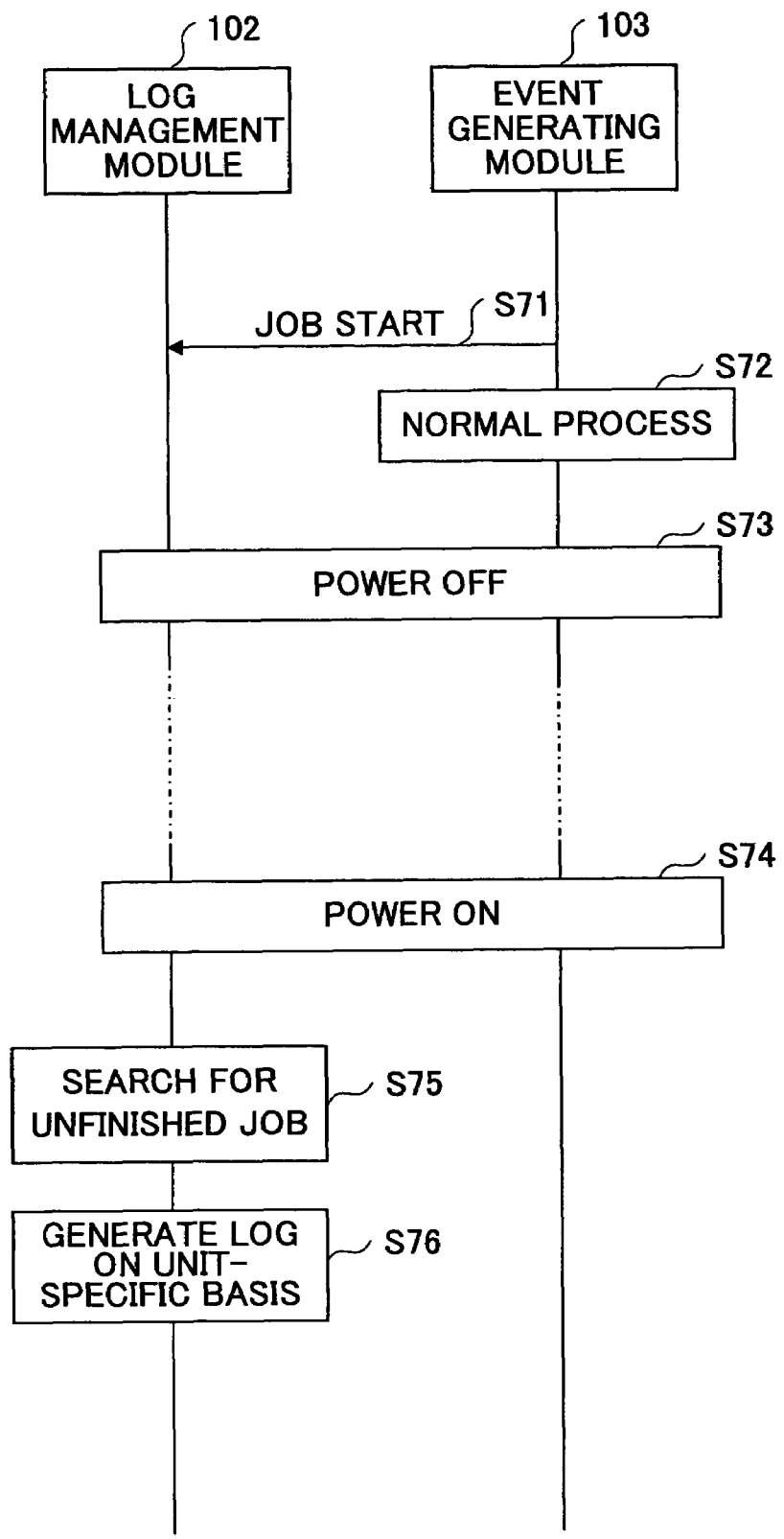
FIG. 9 is a sequence chart showing another example of processes from the occurrence of an event to the generation of a log.

FIG. 9 is a sequence chart showing another example of processes from the occurrence of an event to the generation of a log. At step S71, the event generating module 103 generates a start event of a job operation, which is reported to the log management module 102. At step S72, the event generating module 103 performs a normal process.

At step S73, the power of the multifunction peripheral 1 is turned off before an end event of the job operation is reported to the log management module 102. Namely, the power of the multifunction peripheral 1 is switched off before the log management module 102 generates log information separately for each predetermined unit. At step S74, the multifunction peripheral 1 is powered on. At step S75, the log management module 102 searches for a job operation that has not been completed. At step S76, upon finding an uncompleted job operation, the log management module 102 generates log information separately for each predetermined unit. The sequence chart of FIG. 9 illustrates a case in which the job operation starts, and is then suspended due to power-off, resulting in the job operation being uncompleted.

As illustrated in the sequence charts from FIG. 4 to FIG. 9, the log management module 102 successfully generates log information separately for each predetermined unit regardless of the fate of a job operation, whether it be a normal completion, an abnormal completion, suspension, or the power-off of the multifunction peripheral 1.

Figure 10:
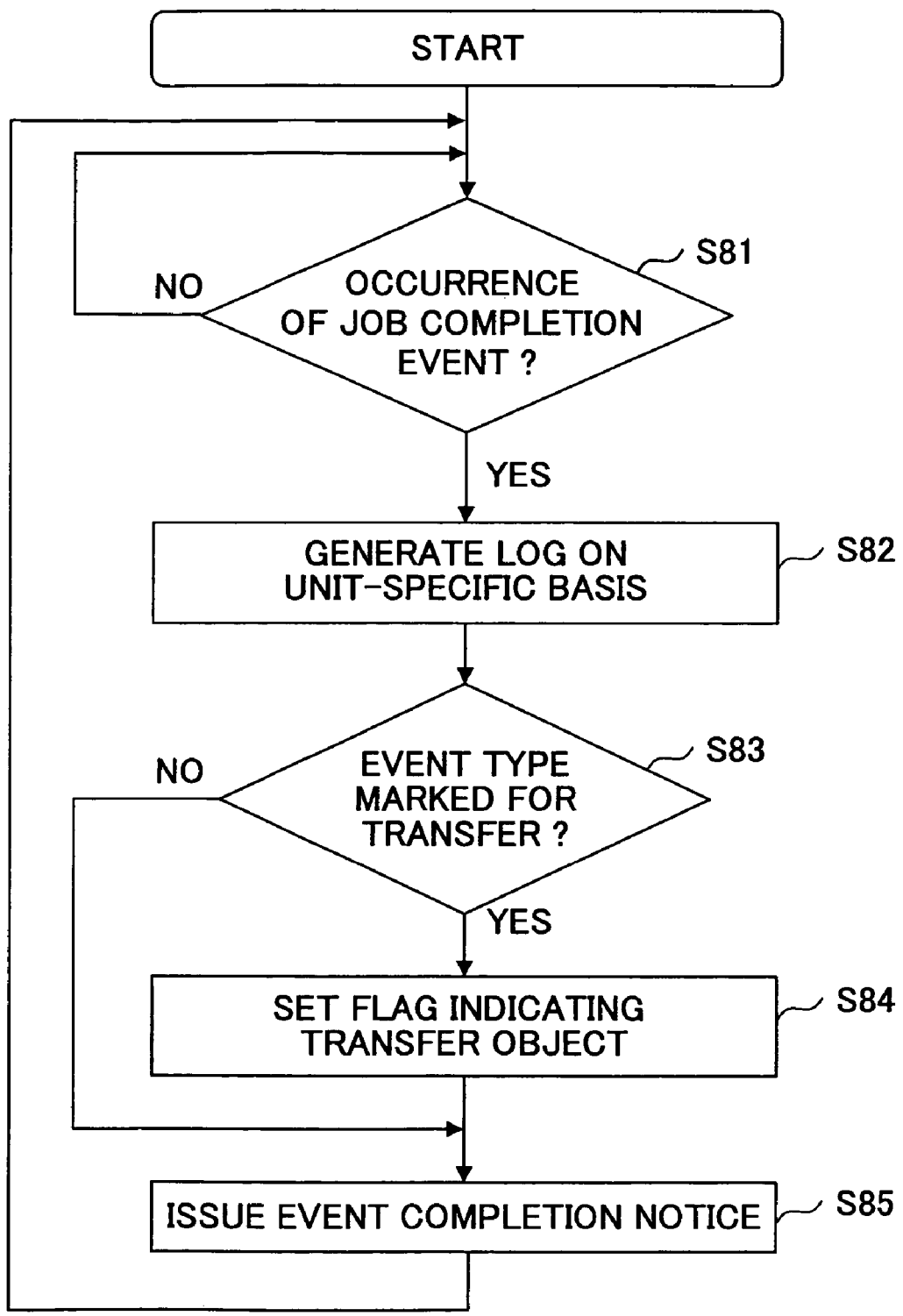
FIG. 10 is a flowchart showing an example of a process performed by a log management module.

In the following, a process performed by the log management module 102 from the occurrence of an event to a notice of the event completion will be described. FIG. 10 is a flowchart showing an example of the process performed by the log management module.

At step S81, the log management module 102 checks whether an end event of a job operation is generated. If an end event of a job operation has not been generated (NO at S81), the log management module 102 repeats the process of step S81. If an end event of a job operation occurs (YES at S81) the log management module 102 generates log information separately for each predetermined unit at step S82.

At step S83, the log management module 102 checks, based on the items "presence/absence of transfer" and "transfer job type" of the log transfer information, whether the generated log information is marked for transfer (subjected to transfer). If the log information is marked for transfer (YES at S83), the log management module 102 sets a flag indicative of a transfer target at step S84, before proceeding to step S85.

If the log information is not marked for transfer (NO at step S83), the log management module 102 proceeds to step S85. At step S85, the log management module 102 issues an event end notice to the log transfer module 101, and returns to the process of step S81.

According to the flowchart of FIG. 10, provision is made to check whether the log information is marked for transfer, and to set a flag indicative of a transfer target.

Figure 11:
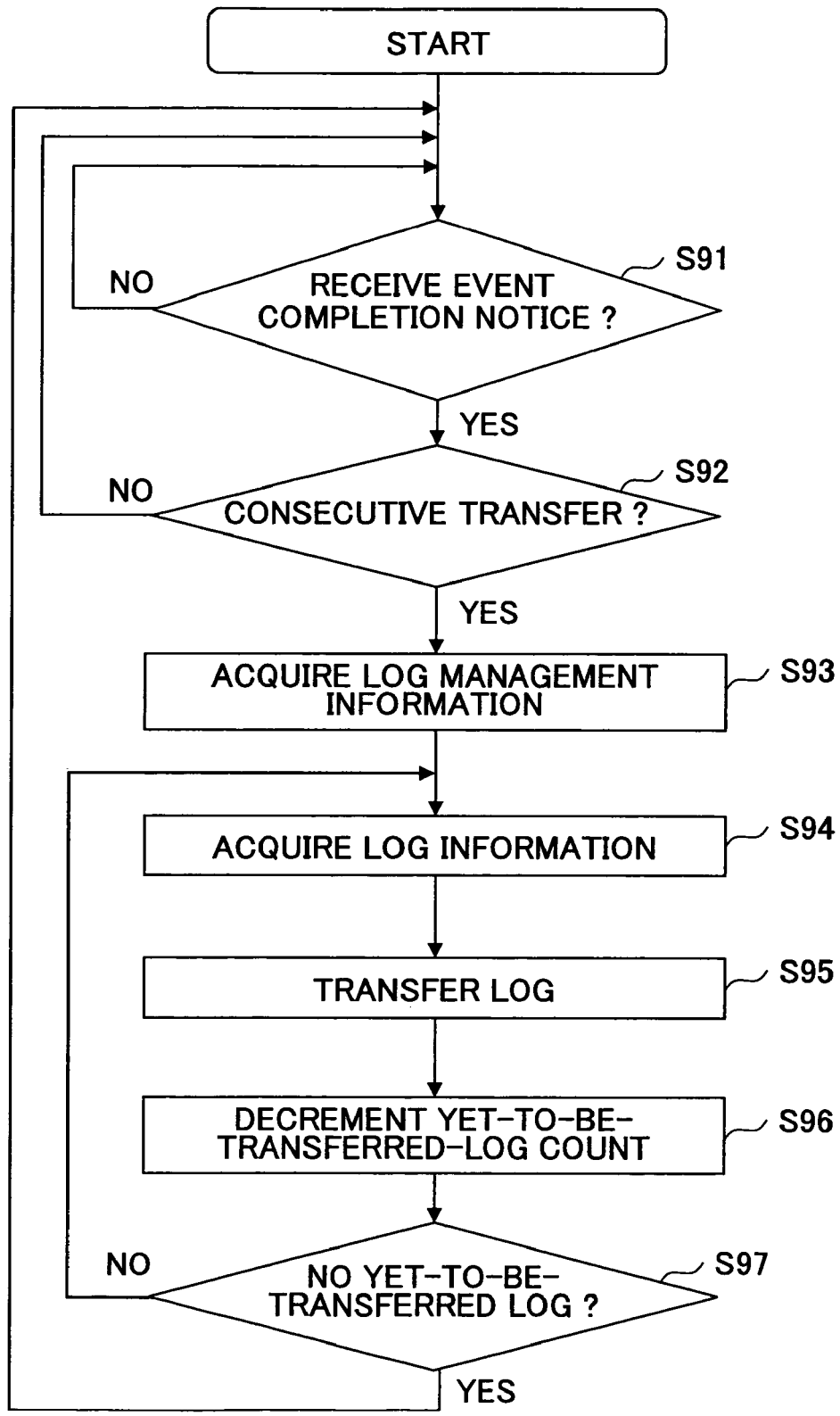
FIG. 11 is a flowchart showing an example of a process performed by a log transfer module.

In the following, a process performed by the log transfer module 101 from the reception of an event end notice to the decrementing of a yet-to-be-transferred-log count will be described. FIG. 11 is a flowchart showing an example of the process performed by the log transfer module.

At step S91, the log transfer module 101 checks whether an event end notice is received from the log management module 102. If it is ascertained that an event end notice has not been received (NO at S91), the log transfer module 101 repeats the process of step S91. If it is ascertained that an event end notice is received (YES at S91), the log transfer module 101 proceeds to step S92.

The log transfer module 101 checks, based on the item "transfer start method" in the log transfer information, whether consecutive transfer is performed with respect to log information. If the log information is not subjected to consecutive transfer (NO at S92), the log transfer module 101 returns to step S91.

If consecutive transfer is to be performed with respect to the log information (YES at S92), the log transfer module 101 proceeds to step S93. The log transfer module 101 increments the yet-to-be-transferred-log count, and acquires the address of the destination of the log information transfer based on the log transfer information.

At step S93, the log transfer module 101 receives the log management information from the log management module 102. Further, the log transfer module 101 receives the log information from the log management module 102. At step S95, the log transfer module 101 transmits the log information to the log transfer client 100, and requests to transmit the log information.

At step S96, the log transfer module 101 decrements the yet-to-be-transferred-log count in response to a success in the transfer of log information. At step S97, the log transfer module 101 checks whether there is log information that has yet to be transferred. If there is log information that has yet to be transferred (NO at S97), the log transfer module 101 returns to the process of step S94. If there is no log information that has yet to be transferred (YES at S97), the log transfer module 101 returns to the process of step S91.

According to the flowchart of FIG. 11, the number of log information pieces that have yet to be transferred among the log information marked for transfer is counted as a yet-to-be-transferred-log count.

In the following, a description will be given of the log lost count transfer process performed by the log transfer module 101. The log lost count transfer process is configured to include a process for setting a log lost count and a process for transferring a log lost count.

Figure 12:
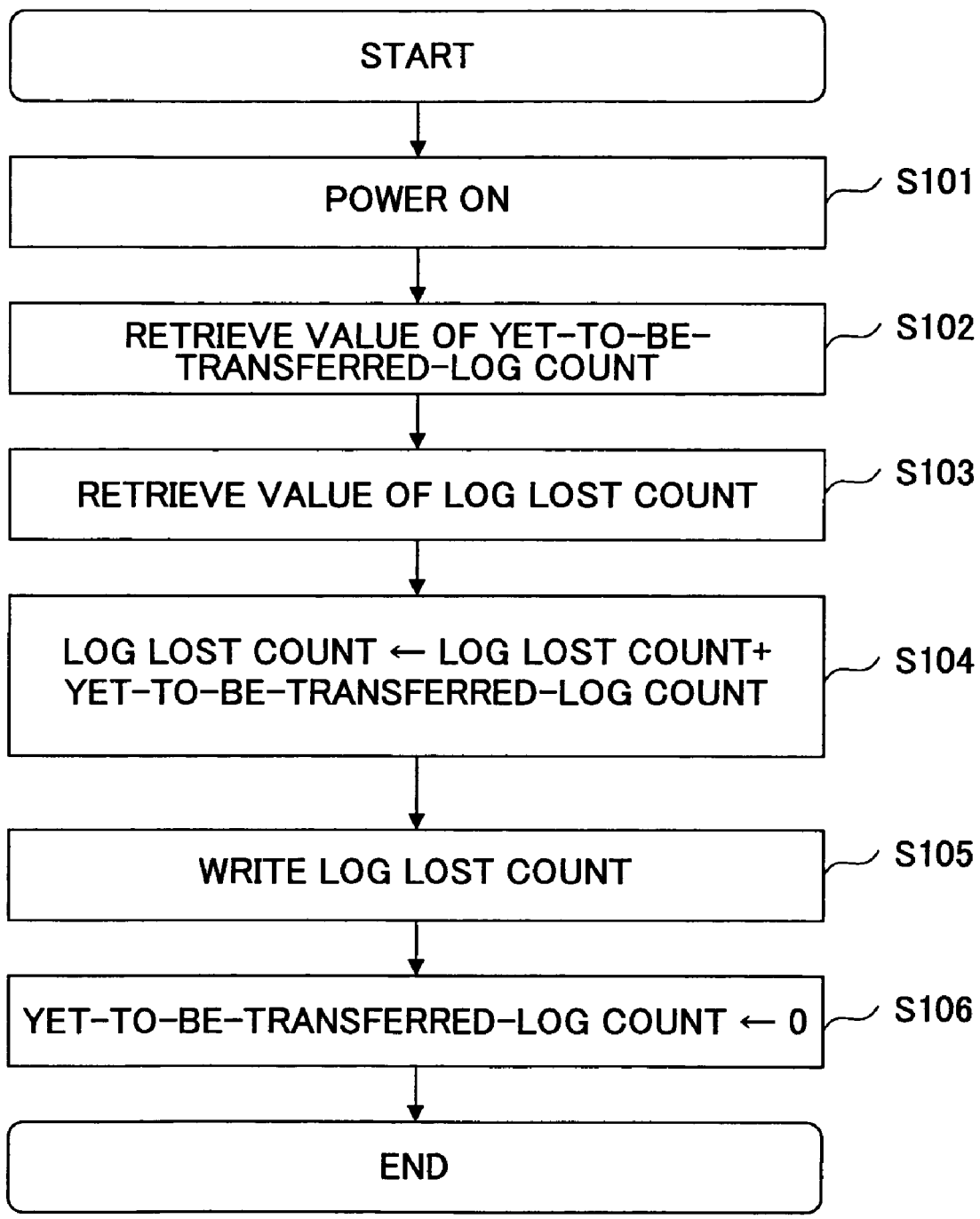
FIG. 12 is a flowchart showing an example of the process for setting a log lost count.

FIG. 12 is a flowchart showing an example of the process for setting a log lost count. The setting of a log lost count is performed immediately after the power-on of the multifunction peripheral 1. It should be noted that the setting of a log lost count needs to be performed prior to the generation of the first log information. The yet-to-be-transferred-log count immediately after the power-on is set to the number of logs that were lost at the time of power-off.

At step s101, the log transfer module 101 is activated upon the power-on. At step S102, the log transfer module 101 retrieves the value of the yet-to-be-transferred-log count. At step S103, the log transfer module 101 retrieves the value of the log lost count. At step S104, the log transfer module 101 adds the retrieved yet-to-be-transferred-log count to the retrieved log lost count to update the log lost count.

At step S105, the log transfer module 101 writes the value of the log lost count. At step s106, the log transfer module 101 resets the yet-to-be-transferred-log count to 0. With this, the process for setting a log lost count comes to an end.

Figure 13:
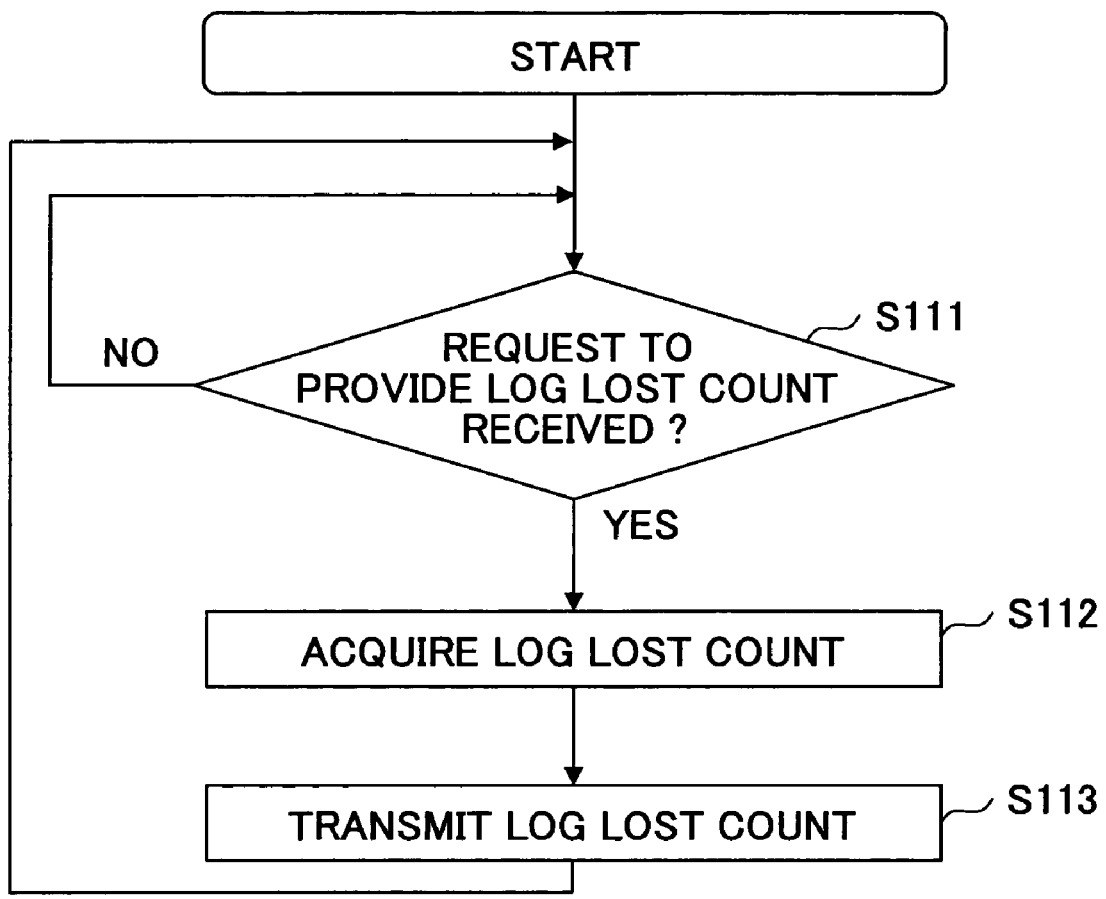
FIG. 13 is a flowchart showing an example of the process for transferring a log lost count.

FIG. 13 is a flowchart showing an example of the process for transferring a log lost count. Transfer of a log lost count may be performed at the time of transfer of log information or at the time of receipt of a request to provide a log lost count. In this example, a description will be given of a case in which a log lost count is transferred upon the receipt of a request to provide a log lost count.

At step S111, the log transfer module 101 checks whether it has received a request to provide a log lost count. Such a request to provide a log lost count may be sent from the log collecting server 2, or may be issued from the operation panel of the multifunction peripheral 1. If it is ascertained that a request to provide a log lost count has not been received (NO at S111), the log transfer module 101 repeats the process of step S111.

If it is ascertained that a request to provide a log lost count has been received (YES at S11), the log transfer module 101 acquires a log lost count at step S112. At step S113, the log transfer module 101 transmits the acquired log lost count as a response to the request to provide a log lost count. The procedure then goes back to the process of step S111.

The yet-to-be-transferred-log count and the log lost count are stored in nonvolatile memory such as an NVRAM. According to the flowcharts of FIG. 12 and FIG. 13, the number of log information pieces that are erased or lost without being transferred is transferred as a log lost count when the log information that has yet to be transferred is erased or lost.

Figure 14:
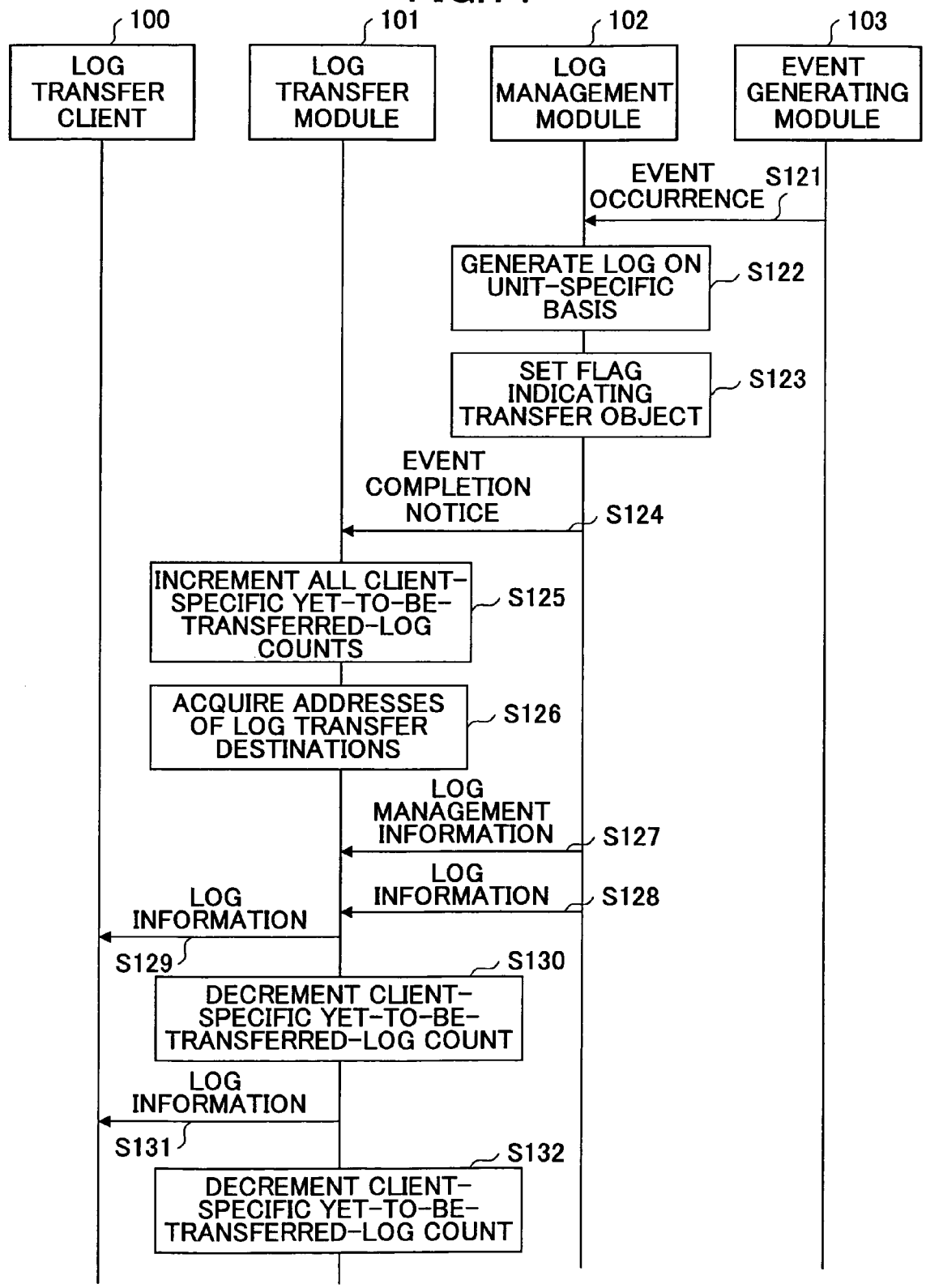
FIG. 14 is a sequence chart showing an example of processes performed from the occurrence of an event to the transfer of a log.

In the following, a description will be given of a process when there are two or more log collecting servers 2 serving as transfer destinations. FIG. 14 is a sequence chart showing an example of processes performed from the occurrence of an event to the transfer of a log. The sequence chart of FIG. 14 is the same as the sequence chart of FIG. 4, except for a portion thereof, and a description thereof will be omitted as appropriate.

At step S121, the event generating module 103 generates an event. Upon the generation of an event, the log management module 102 generates log information separately for each predetermined unit at step S122. At step S123, the log management module 102 checks whether or not the generated log information is subjected to transfer based on the item "presence/absence of transfer" contained in the log transfer information. If the log information is subjected to transfer (marked for transfer), the log management module 102 sets a flag indicating a transfer object.

At step S124, the log management module 102 transmits an event completion notice to the log transfer module 101. At step S125, the log transfer module 101 increments all the client-specific yet-to-be-transferred-log counts, each of which is provided separately for each log transfer client 100. At step S126, the log transfer module 101 acquires the addresses (e.g., URLs) of destinations of the log information based on the log transfer information. At step S127, the log management module 102 transmits log management information to the log transfer module 101. At step S128, the log management module 102 transmits the log information to the log transfer module 101.

At step S129, the log transfer module 101 transmits the log information to the log transfer client 100, and requests to transfer the log information to at least one of the addresses acquired at step S126. The log transfer client 100 may transfer the log information to the address having higher priority among the acquired addresses. If it is not possible to transfer the log information to the address having higher priority, the log transfer client 100 may transfer the log information to the address having lower priority among the acquired addresses. At step S130, the log transfer module 101 decrements the client-specific yet-to-be-transferred-log count in response to a success in the transfer of the log information.

At step S131, the log transfer module 101 transmits the log information to the log transfer client 100, and requests to transfer the log information to at least one of the addresses acquired at step S126. At step S132, the log transfer module 101 decrements the client-specific yet-to-be-transferred-log count in response to a success in the transfer of the log information.

According to the sequence chart of FIG. 14, the log information that is marked for transfer in the log transfer information among the generated log information can be transmitted to a plurality of transfer destinations that are set in the log transfer information.

Figure 15:
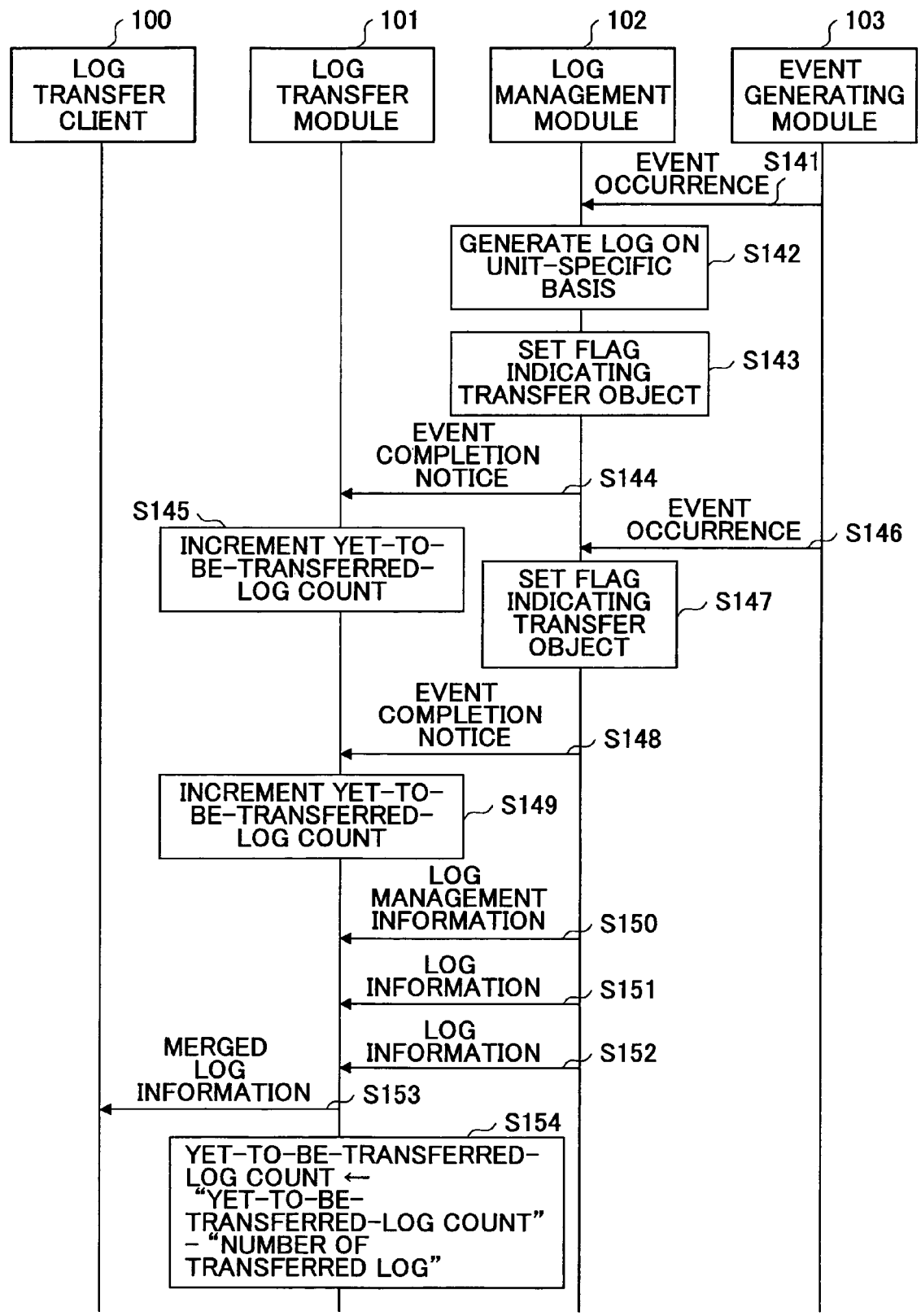
FIG. 15 is a sequence chart showing another example of processes performed from the occurrence of an event to the transfer of a log.

In the following, a description will be given of a process performed when a plurality of log information pieces are transferred together in a lump. FIG. 15 is a sequence chart showing another example of processes performed from the occurrence of an event to the transfer of a log. The sequence chart of FIG. 15 is the same as the sequence chart of FIG. 4, except for a portion thereof, and a description thereof will be omitted as appropriate.

At step S141, the event generating module 103 generates an event. Upon the generation of an event, the log management module 102 generates log information separately for each predetermined unit at step S142. At step S143, the log management module 102 checks whether or not the generated log, information is subjected to transfer based on the item "presence/absence of transfer" contained in the log transfer information. If the log information is subjected to transfer (marked for transfer), the log management module 102 sets a flag indicating a transfer object.

At step S144, the log management module 102 transmits an event completion notice to the log transfer module 101. At step S145, the log transfer module 101 increments the yet-to-be-transferred-log count.

At step S146, the event generating module 103 generates an event. Upon the generation of an event, the log management module 102 generates log information separately for each predetermined unit. At step S147, the log management module 102 checks whether or not the generated log information is subjected to transfer based on the item "presence/absence of transfer" contained in the log transfer information. If the log information is subjected to transfer (marked for transfer), the log management module 102 sets a flag indicating a transfer object.

At step S148, the log management module 102 transmits an event completion notice to the log transfer module 101. At step S149, the log transfer module 101 increments the yet-to-be-transferred-log count. The log transfer module 101 acquires, based on the log transfer information, a plurality of addresses of the destinations to which the log information is transferred. At step S150, the log management module 102 transmits log management information to the log transfer module 101.

At step S151, the log management module 102 transmits the log information to the log transfer module 101. At step S152, the log management module 102 transmits the log information to the log transfer module 101.

At step S153, the log transfer module 101 generates merged log information made by merging the log information received at step S151 and the log information received at step S152, and transmits the merged log information to the log transfer client 100, thereby requesting to transfer the merged log information to the acquired addresses. At step S154, the log transfer module 101 subtracts the number of logs contained in the merged log information transferred at step S153 from the yet-to-be-transferred-log count in response to a success in the transfer of the merged log information. This updates the yet-to-be-transferred-log count.

The merged log information is transferred from the multifunction peripheral 1 to the log collecting server 2 by using a SOAP message as shown in FIG. 16. FIG. 16 is an illustrative drawing showing an example of a SOAP message for transferring merged log information. According to the sequence chart of FIG. 15, a plurality of log information pieces are transferred together in a lump to the transfer destinations specified in the log transfer information.

Figure 17:
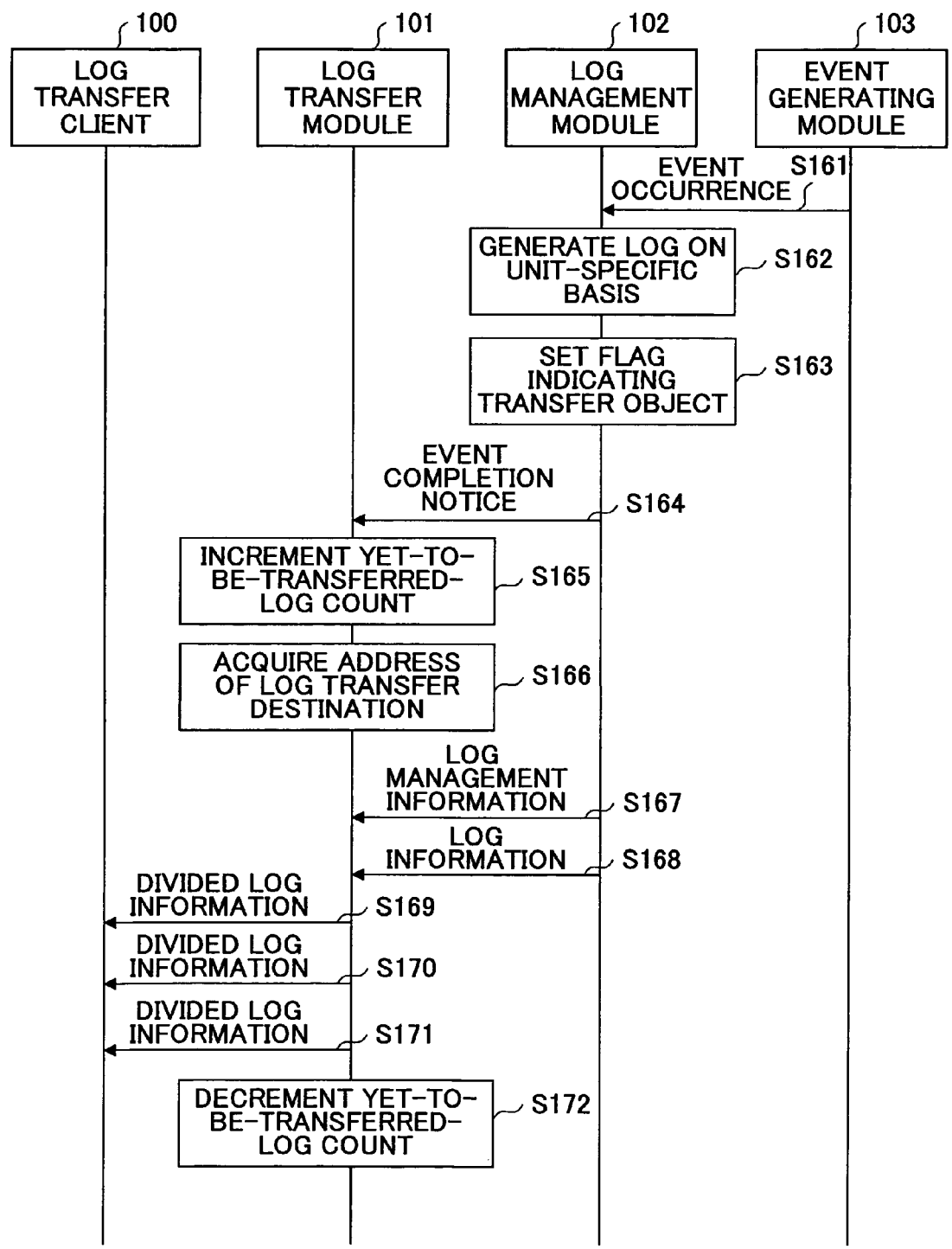
FIG. 17 is a sequence chart showing another example of processes performed from the occurrence of an event to the transfer of a log.

In the following, a description will be given of a process performed when log information is divided and transferred in pieces. FIG. 17 is a sequence chart showing another example of processes performed from the occurrence of an event to the transfer of a log. The sequence chart of FIG. 17 is the same as the sequence chart of FIG. 4, except for a portion thereof, and a description thereof will be omitted as appropriate.

At step S161, the event generating module 103 generates an event. Upon the generation of an event, the log management module 102 generates log information separately for each predetermined unit at step S162. At step S163, the log management module 102 checks whether or not the generated log information is subjected to transfer based on the item "presence/absence of transfer" contained in the log transfer information. If the log information is subjected to transfer (marked for transfer), the log management module 102 sets a flag indicating a transfer object.

At step S164, the log management module 102 transmits an event completion notice to the log transfer module 101. At step S165, the log transfer module 101 increments the yet-to-be-transferred-log count.

At step S166, the log transfer module 101 acquires, based on the log transfer information, the address to which the log information is to be transferred. At step S167, the log management module 102 transmits log management information to the log transfer module 101. At step S168, the log management module 102 transmits the log information to the log transfer module 101.

At steps S169 through S171, the log transfer module 101 generates divided log information made by dividing the received log information, and transmits the divided log information to the log transfer client 100, thereby requesting to transfer the log information to the acquired address. At step S172, the log transfer module 101 decrements the yet-to-be-transferred-log count in response to a success in the transfer of the log information. This updates the yet-to-be-transferred-log count.

The divided log information is transferred from the multifunction peripheral 1 to the log collecting server 2 by using a SOAP message as shown in FIG. 18 and FIG. 19. FIG. 18 and FIG. 19 are illustrative drawings showing an example of a SOAP message for transferring divided log information. According to the sequence chart of FIG. 17, log information are divided and transferred to the transfer destination specified in the log transfer information.

Figure 20:
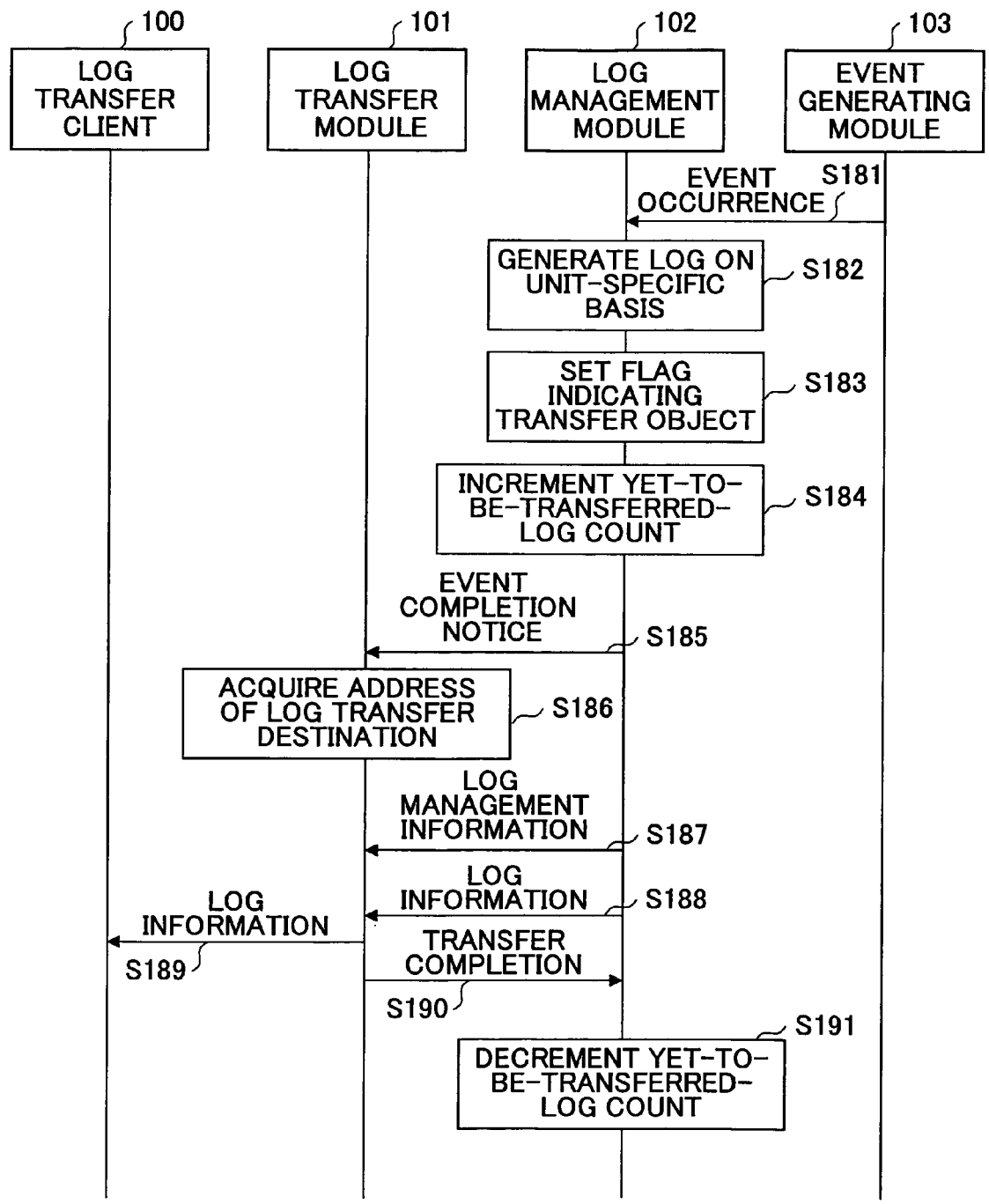
FIG. 20 is a sequence chart showing an example of processes performed from the occurrence of an event to the transfer of a log.

The sequence chart described above has been described with reference to an example in which the yet-to-be-transferred-log count is kept in the log transfer module 101. Nonetheless, the yet-to-be-transferred-log count may be kept in the log management module 102. FIG. 20 is a sequence chart showing an example of processes performed from the occurrence of an event to the transfer of a log.

At step S181, the event generating module 103 generates an event. Upon the generation of an event, the log management module 102 generates log information separately for each predetermined unit at step S182. At step S183, the log management module 102 checks whether or not the generated log information is subjected to transfer based on the item "presence/absence of transfer" contained in the log transfer information. If the log information is subjected to transfer (marked for transfer), the log management module 102 sets a flag indicating a transfer object.

At step S184, the log management module 102 increments the yet-to-be-transferred-log count. In this manner, it is the log management module 102 that counts the number of logs that have yet to be transferred. At step S185, the log management module 102 transmits an event completion notice to the log transfer module 101.

At step S186, the log transfer module 101 acquires, based on the log transfer information, the address to which the log information is to be transferred. At step S187, the log management module 102 transmits log management information to the log transfer module 101. At step S188, the log management module 102 transmits the log information to the log transfer module 101.

At step S189, the log transfer module 101 transmits the log information to the log transfer client 100 to request the transfer of the log information. The log transfer client 100 transfers the log information to the address acquired at step S186. At step S190, the log transfer module 101 notifies the log management module 102 of the completion of transfer. At step S191, the log management module 102 decrements the yet-to-be-transferred-log count in response to the notice indicative of the completion of log information transfer.

According to the sequence chart of FIG. 20, the log information that is marked for transfer in the log transfer information among the generated log information is transferred to the transfer destination specified in the log transfer information. Further, according to the sequence chart of FIG. 20, the number of log information pieces that have yet to be transferred, among the log information marked for transfer, is counted by the log management module 102 as a yet-to-be-transferred-log count.

Further, the present invention is not limited to these embodiments, but various variations and modifications may be made without departing from the scope of the present invention.

The present application is based on Japanese priority application No. 2004-294283 filed on Oct. 6, 2004, with the Japanese Patent Office, the entire contents of which are hereby incorporated by reference.

What is claimed is:

1. An image forming apparatus for performing a process relating to forming of an image, comprising:
   a log management unit configured to generate log information based on an event occurrence, and to generate a flag based on a comparison between the log information and settings in log transfer information to control whether the log information is to be transferred; and
   a log transfer unit configured to transfer log information of a type specified in the log transfer information, among the log information managed by said log management unit, to a transfer destination specified in the log transfer information,
   wherein said log transfer unit is configured to count a number of log information pieces that are erased or lost without being transferred among the log information flagged for transfer.

2. The image forming apparatus as claimed in claim 1, wherein said log transfer unit is configured to select transfer destinations available for transfer of log information among transfer destinations having different priority as defined in the log transfer information, and to transfer the log information of the specified type to a destination having highest priority among the selected transfer destinations.

3. The image forming apparatus as claimed in claim 1, wherein said log transfer unit is configured to select one group corresponding to the specified type of the log information from a plurality of groups made up from one or more transfer destinations specified in the log transfer information, to select transfer destinations available for transfer of log information in the selected group, and to transfer the log information of the specified type to a destination having highest priority among the selected transfer destinations.

4. The image forming apparatus as claimed in claim 1, wherein said log transfer unit is configured to select transfer destinations available for transfer of log information separately for each of a plurality of groups made up from one or more transfer destinations specified in the log transfer information, and to transfer the log information of the specified type to a destination having highest priority in each group among the selected transfer destinations selected for each group.

5. The image forming apparatus as claimed in claim 1, wherein said log transfer unit is configured to transfer log information in a consecutive manner or at constant intervals.

6. The image forming apparatus as claimed in claim 1, wherein said log transfer unit transfers a count to the transfer destination specified in the log transfer information, said count indicating the number of log information pieces that are erased or lost without being transferred among the log information marked for transfer.

7. The image forming apparatus as claimed in claim 1, wherein said log transfer unit said is configured to count a number of log information pieces marked for transfer as a yet-to-be-transferred-log count, and to count, as a log lost count, a number of log information pieces that are erased or lost without being transferred among the log information marked for transfer.

8. The image forming apparatus as claimed in claim 7, further comprising a nonvolatile memory unit, wherein said log transfer unit stores the yet-to-be-transferred-log count and the log lost count in said nonvolatile memory unit.

9. A method of transferring a log from an image forming apparatus for performing a process relating to forming of an image, comprising:
   a storing step of storing generated log information in memory based on an event occurrence;
   a flagging step of generating a flag based on a comparison between the log information and settings in log transfer information to control whether the log information is to be transferred;
   a transfer step of transferring log information of a type specified in the log transfer information, among the log information stored in the memory, to a transfer destination specified in the log transfer information; and
   a counting step of counting a number of log information pieces that are erased or lost without being transferred among the log information flagged for transfer, in response to finding that the log information stored in the memory is erased or lost.

10. The method as claimed in claim 9, wherein said transfer step includes:
    selecting transfer destinations available for transfer of log information among transfer destinations having different priority as defined in the log transfer information; and
    transferring the log information of the specified type to a destination having highest priority among the selected transfer destinations.

11. The method as claimed in claim 9, wherein said transfer step includes:
    selecting one group corresponding to the specified type of the log information from a plurality of groups made up from one or more transfer destinations specified in the log transfer information;
    selecting transfer destinations available for transfer of log information in the selected group; and
    transferring the log information of the specified type to a destination having highest priority among the selected transfer destinations.

12. The method as claimed in claim 9, wherein said transfer step includes:
    selecting transfer destinations available for transfer of log information separately for each of a plurality of groups made up from one or more transfer destinations specified in the log transfer information; and
    transferring the log information of the specified type to a destination having highest priority in each group among the selected transfer destinations selected for each group.

13. The method as claimed in claim 9, wherein said transfer step is performed consecutively each time log information is generated, or performed at constant intervals.

14. The method as claimed in claim 9, wherein a count indicating the number of log information pieces that are erased or lost without being transferred among the log information marked for transfer is transferred to the transfer destination specified in the log transfer information.

15. The method as claimed in claim 9, further comprising:
   counting a number of log information pieces marked for transfer as a yet-to-be-transferred-log count; and
   counting, as a log lost count, a number of log information pieces that are erased or lost without being transferred among the log information marked for transfer.

16. The method as claimed in claim 15, wherein the yet-to-be-transferred-log count and the log lost count are stored in nonvolatile memory.

17. A log transfer system, comprising:
   an image forming apparatus to perform a process relating to forming of an image;
   one or more log collecting servers coupled to said image forming apparatus via a network, wherein said image forming apparatus includes:
   a log management unit configured to generate log information based on an event occurrence, and to generate a flag based on a comparison between the log information and settings in log transfer information to control whether the log information is to be transferred; and
   a log transfer unit configured to transfer log information of a type specified in the log transfer information, among the log information managed by said log management unit, to a transfer destination specified in the log transfer information,
   wherein said log transfer unit is configured to count a number of log information pieces that are erased or lost without being transferred among the log information flagged for transfer.

18. The log transfer system as claimed in claim 17, further comprising a setting server coupled to said image forming apparatus via the network to set the log transfer information.

19. The log transfer system as claimed in claim 17, further comprising a tallying server coupled to said one or more log collecting servers via the network to collect log information from said one ore more log collecting servers.

* * * * *